United States Patent
Rodionov et al.

(10) Patent No.: US 9,903,344 B2
(45) Date of Patent: *Feb. 27, 2018

(54) POWER GENERATION SYSTEM INCLUDING WIND POWER GENERATION AND SOLAR THERMAL POWER GENERATION

(71) Applicant: KABUSHIKI KAISHA TOSHIBA, Tokyo (JP)

(72) Inventors: Mikhail Rodionov, Kanagawa (JP); Yasuo Takagi, Kanagawa (JP); Nobuo Okita, Kanagawa (JP); Kazuo Takahata, Kanagawa (JP); Yoichi Tone, Tokyo (JP); Dai Murayama, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 119 days.

This patent is subject to a terminal disclaimer.

(21) Appl. No.: 14/614,599

(22) Filed: Feb. 5, 2015

(65) Prior Publication Data
US 2015/0145254 A1 May 28, 2015

Related U.S. Application Data

(63) Continuation of application No. PCT/JP2013/004589, filed on Jul. 29, 2013.

(30) Foreign Application Priority Data

Aug. 7, 2012 (JP) .................. 2012-175413
Aug. 7, 2012 (JP) .................. 2012-175414
Aug. 7, 2012 (JP) .................. 2012-175415

(51) Int. Cl.
*F03G 6/06* (2006.01)
*F03D 9/00* (2016.01)
(Continued)

(52) U.S. Cl.
CPC ............ *F03D 9/006* (2013.01); *F03D 9/007* (2013.01); *F03D 9/22* (2016.05); *F03D 9/255* (2017.02);
(Continued)

(58) Field of Classification Search
CPC .......... Y02E 10/40–10/47; Y02E 10/70; Y02E 10/72; Y02E 10/723; Y02E 10/725;
(Continued)

(56) References Cited

U.S. PATENT DOCUMENTS 4,164,123 A * 8/1979 Smith .................... F03G 6/065
126/684
4,206,608 A * 6/1980 Bell ...................... F03D 9/007
290/4 R
(Continued)

FOREIGN PATENT DOCUMENTS

CN      102200320 A    9/2011
JP       03-189372 A    8/1991
(Continued)

*Primary Examiner* — Laert Dounis
(74) *Attorney, Agent, or Firm* — Foley & Lardner LLP

(57) ABSTRACT

Electric power obtained by wind power generation is used effectively. A power generation system in an embodiment includes: a wind power generation apparatus; a solar thermal power generation apparatus; and an electrothermal converting unit. The solar thermal power generation apparatus includes: a heater heating a heating medium by solar heat; and a heat exchanger exchanging heat of the heating medium heated by the heater and heat of a working fluid to operate a drive mechanism of a power generator. The electrothermal converting unit converts part of electric power generated by the wind power generation apparatus into heat to heat the heating medium.

14 Claims, 30 Drawing Sheets

(51) Int. Cl.
    *H02P 101/15*    (2016.01)
    *F03D 9/22*      (2016.01)
    *F03D 9/25*      (2016.01)
    *F03D 9/18*      (2016.01)

(52) U.S. Cl.
    CPC .............. *F03G 6/067* (2013.01); *F03D 9/18* (2016.05); *H02P 2101/15* (2015.01); *Y02E 10/465* (2013.01); *Y02E 10/72* (2013.01)

(58) Field of Classification Search
    CPC . F03D 9/00; F03D 9/003; F03D 9/006; F03D 9/007; F03D 9/18; F03D 9/22; F03D 1/02; F03D 7/0276; F03D 7/028; F03D 7/0284; F03D 7/042–7/048; H02P 2101/15; H02P 9/48; F03G 6/00; F03G 6/003; F03G 6/005; F03G 6/06; F03G 6/054; F03G 6/057; F03G 2009/061; F03G 2009/062; G05B 2219/2619; B60L 8/006
    USPC ................ 60/641.8–641.15; 290/44, 54, 55; 700/286–298
    See application file for complete search history.

(56) References Cited

U.S. PATENT DOCUMENTS

| | | | | |
|---|---|---|---|---|
| 5,384,489 | A * | 1/1995 | Bellac | F03D 9/006 290/44 |
| 6,372,978 | B1 | 4/2002 | Cifaldi | |
| 6,512,966 | B2 * | 1/2003 | Lof | F03D 7/0284 290/44 |
| 7,667,343 | B2 * | 2/2010 | Oohara | C25B 15/02 290/44 |
| 8,312,733 | B2 * | 11/2012 | Tsarev | F03D 9/006 62/238.3 |
| 9,512,826 | B2 * | 12/2016 | Rodionov | F03G 6/005 |
| 2005/0126560 | A1 * | 6/2005 | Litwin | F24J 2/085 126/683 |
| 2006/0168961 | A1 * | 8/2006 | Alekseevich | F03D 9/007 60/641.8 |
| 2007/0220889 | A1 * | 9/2007 | Nayef | F01K 3/08 60/652 |
| 2008/0121525 | A1 * | 5/2008 | Doland | C25B 1/04 204/661 |
| 2008/0303348 | A1 * | 12/2008 | Witters | H02J 3/46 307/72 |
| 2009/0165780 | A1 * | 7/2009 | Ota | F03G 6/00 126/634 |
| 2012/0049517 | A1 * | 3/2012 | Yasugi | F03D 7/0284 290/44 |
| 2012/0325290 | A1 * | 12/2012 | Gizara | F03G 6/00 136/248 |
| 2013/0162215 | A1 * | 6/2013 | Cooper | G05B 15/02 320/127 |

FOREIGN PATENT DOCUMENTS

| | | |
|---|---|---|
| JP | 09-189285 A | 7/1997 |
| JP | 2003333752 A * | 11/2003 |
| JP | 2004-069197 A | 3/2004 |
| JP | 2008-298389 A | 12/2008 |
| JP | 2011-137393 A | 7/2011 |
| JP | 2011-169171 A | 9/2011 |
| JP | 2012-093005 A | 5/2012 |
| JP | 2012-100487 A | 5/2012 |
| JP | 2012-112298 A | 6/2012 |
| WO | WO 2012/057120 A1 | 5/2012 |

* cited by examiner

POWER GENERATION SYSTEM INCLUDING WIND POWER GENERATION AND SOLAR THERMAL POWER GENERATION

CROSS-REFERENCE TO RELATED APPLICATIONS

This application is a continuation of prior International Application No. PCT/JP2013/004589 filed on Jul. 29, 2013, which is based upon and claims the benefit of priority from Japanese Patent Applications No. 2012-175413 filed on Aug. 7, 2012, No. 2012-175414 filed on Aug. 7, 2012, and No. 2012-175415 filed on Aug. 7, 2012; the entire contents of all of which are incorporated herein by reference.

FIELD

Embodiments described herein relate generally to a power generation system.

BACKGROUND

A power generation system including a wind power generation apparatus, a solar photovoltaic power generation apparatus, and the like performs power generation by means of renewable energy to output electric power to an electric power system. In such a power generation system, due to natural conditions to change irregularly, the power generation output does not stabilize and fluctuates. That is, a power generation amount sometimes fluctuates greatly. As a result, fluctuations of electric power are sometimes caused in the electric power system to degrade the quality of electric power.

Therefore, it has been proposed that electric power should be stabilized by means of a storage battery to improve the quality of electric power. Concretely, when electric power generated by a power generation device described above is surplus, a storage battery is charged with a surplus, and when it is insufficient, the storage battery is discharged, and thereby fluctuations of electric power are compensated.

However, the storage battery has advantages of good conversion efficiency of electric power and the like, but its aged deterioration caused by repeated charge and discharge needs to be considered, resulting in that a running cost increases due to exchange of batteries. In consideration of such a background, in the power generation system using renewable energy, how effectively generated electric power having large fluctuations is used results in an important factor.

Further, when power generation is performed on a large scale in the power generation system described above, a large-scale storage battery is required, so that a considerable expense is required. Due to such circumstances, it is not easy to smooth power generation output at low cost, and it is sometimes difficult to stabilize electric power.

An object to be solved by the present invention is to provide a power generation system capable of effectively using electric power obtained by wind power generation and capable of easily achieving stabilization of electric power.

DETAILED DESCRIPTION

A power generation system in an embodiment includes: a wind power generation apparatus, a solar thermal power generation apparatus; and an electrothermal converting unit. The solar thermal power generation apparatus includes: a heater heating a heating medium by solar heat; and a heat exchanger exchanging heat of the heating medium heated by the heater and heat of a working fluid to operate a drive mechanism of a power generator. The electrothermal converting unit converts part of electric power generated by the wind power generation apparatus into heat to heat the heating medium.

Hereinafter, there will be explained embodiments based on the drawings.

First Embodiment

Figure 1:
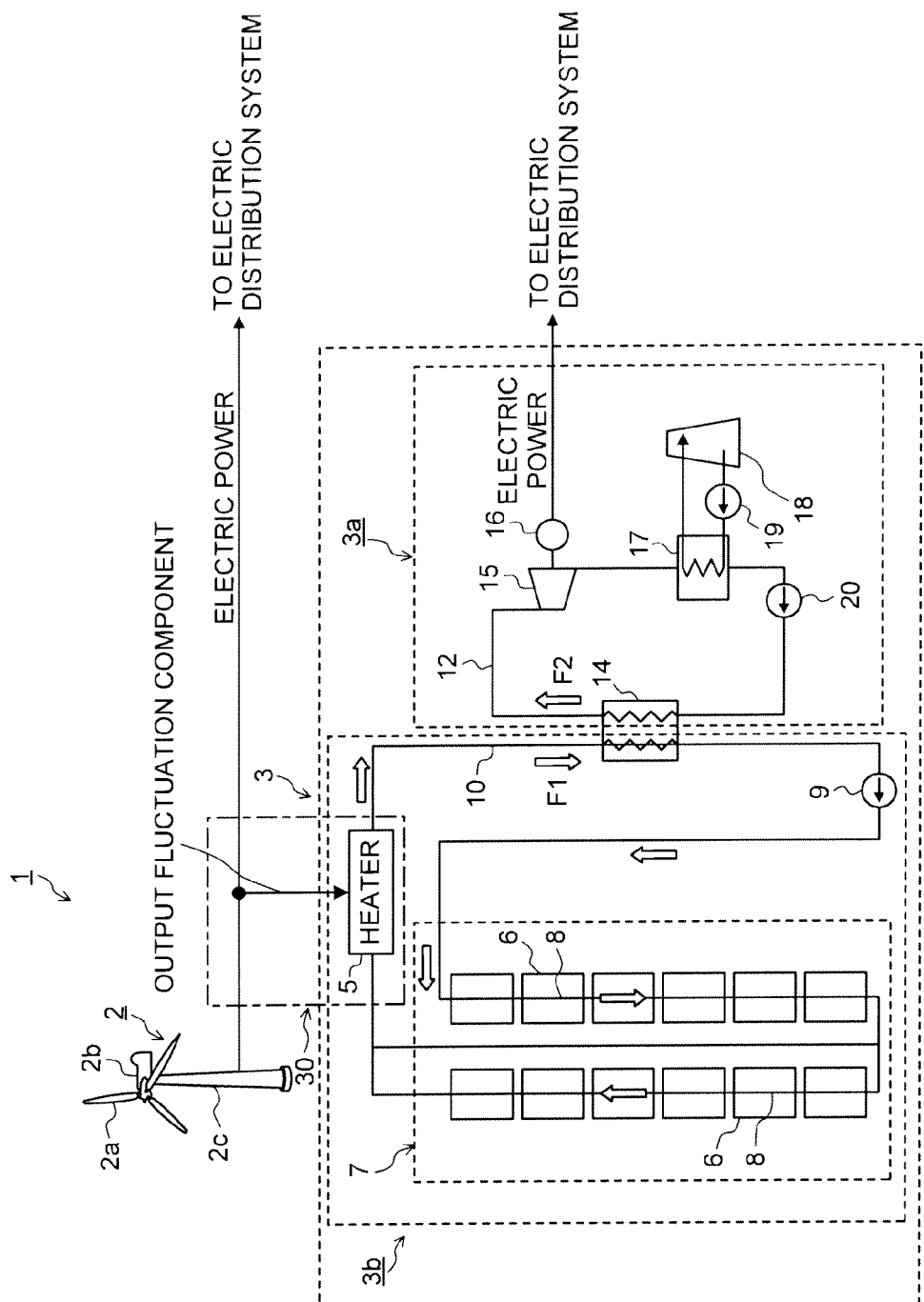
FIG. 1 is a constitution view of a power generation system according to a first embodiment.

As illustrated in FIG. 1, a power generation system 1 in this embodiment is a hybrid power generation system in which a wind power generation apparatus 2 and a solar thermal power generation apparatus 3 are combined.

The wind power generation apparatus 2 includes: as illustrated in FIG. 1, a propeller windmill; a plurality of wings 2a (blades) supported by a rotor (whose illustration is omitted); a nacelle 2b; and a tower 2c. Incidentally, in the wind power generation apparatus 2, the part of the rotor and the wings 2a is also called a "windmill."

Figure 2:
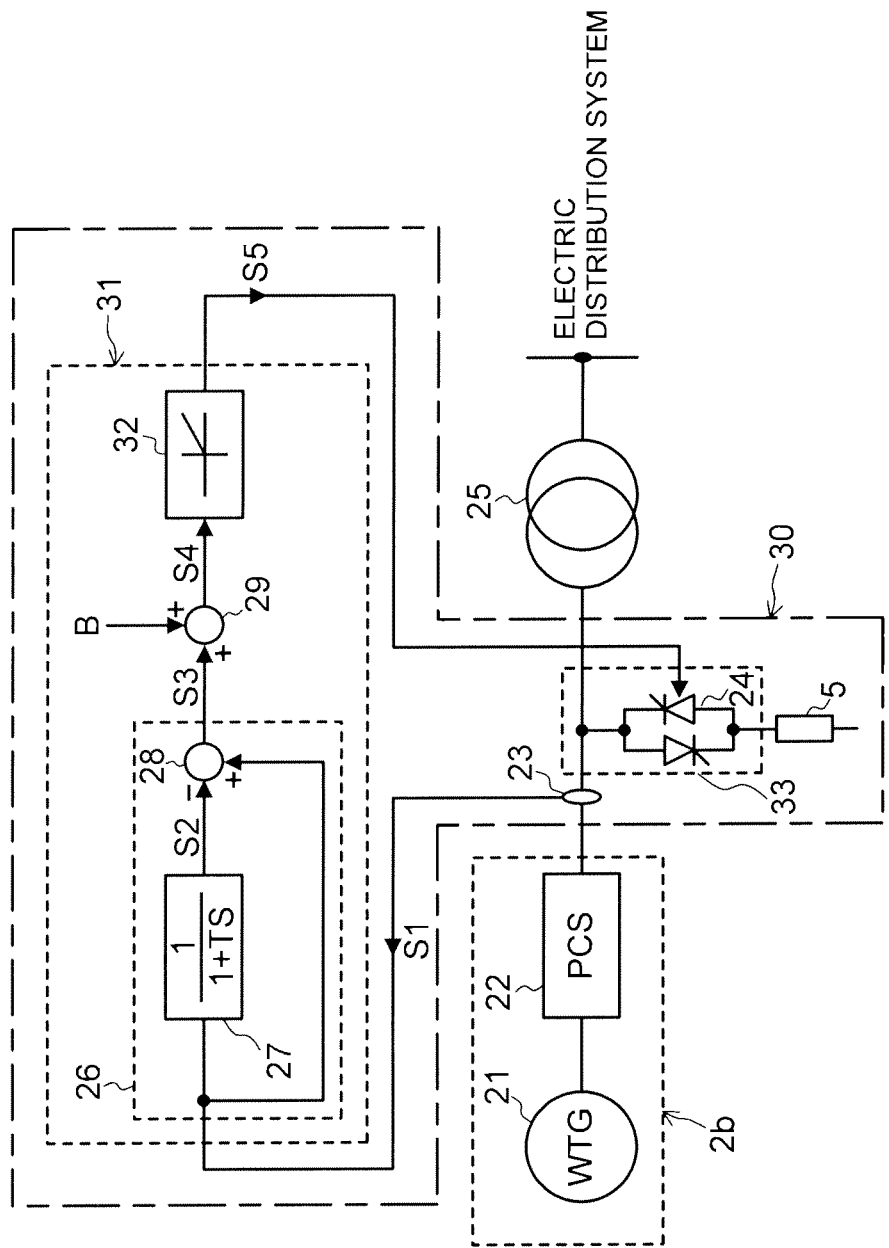
FIG. 2 is a block diagram functionally illustrating an electrothermal converting unit in the power generation system according to the first embodiment.

In the nacelle 2b and the like, as illustrated in FIG. 1 or FIG. 2, a speed-increasing gear (whose illustration is omitted), a power generator 21 (WTG: Wind Turbine Generator), a power conditioner 22 (PCS: Power Conditioning System), and the like are housed.

The plural wings 2a rotate by wind power, and their rotational force is transmitted to the power generator 21 via respective units such as a rotation shaft and the speed-increasing gear (whose illustration is omitted). The power generator 21 is driven by the transmitted rotational force to perform power generation. The power conditioner 22 is a direct current-alternating current converter, and converts electric power generated by the power generator 21 to alternating current electric power at a predetermined frequency (for example, 60 Hz or 50 Hz) to output it.

On the other hand, the solar thermal power generation apparatus 3, as illustrated in FIG. 1, includes: a circulating system 3a on the turbine side where a working fluid F2 to operate a turbine 15 circulates; and a circulating system 3b where a heating medium F1 to heat the working fluid F2 circulates.

In the circulating system 3b of the heating medium F1, a heating medium circulation channel 10, a heater 5, a heating medium transfer pump 9, a heat exchanger 14, and a solar heat collector 7 are provided. The heating medium F1 is a heating medium oil capable of being heated to a temperature of 200° C. to 300° C. or so, for example.

The solar heat collector 7 is a heater to heat the heating medium F1 by collecting solar heat. The solar heat collector 7 is provided with a plurality of mirrors 6 and a pipe 8. The pipe 8 constitutes part of the heating medium circulation channel 10, and inside the pipe 8, the heating medium F1 flows.

The relative orientation of the mirrors 6 with respect to the sun and the pipe 8 is appropriately changed (adjusted) by a mirror driving unit (whose illustration is omitted). The solar heat collector 7 collects solar heat by collecting sunlight onto a circumferential surface of the pipe 8 installed in front of the mirrors 6. Then, by the collected solar heat, the heating medium F1 flowing through the pipe 8 is heated.

The heater 5 is an electric heater to be driven (operated) by electric power. The heater 5 is provided at any place of the heating medium circulation channel 10, and further heats the heating medium F1 flowing through the heating medium circulation channel 10. The heating medium circulation channel 10 includes the pipe 8 installed in front of the mirrors 6 as part of the channel. In the heating medium circulation channel 10, the heating medium F1 flows and circulates via the solar heat collector 7, an electrothermal converting unit 30 including the heater 5 (to be described later), and the heat exchanger 14. The heating medium transfer pump 9 transfers the heating medium F1 to the heating medium circulation channel 10.

As illustrated in FIG. 1, the circulating system 3a on the turbine side applies a binary power generation system, for example, in which a low-boiling-point medium having a boiling point lower than that of water (for example, an organic medium such as pentane, a mixed fluid of ammonia and water) circulates as the working fluid F2. Incidentally, the circulating system 3a on the turbine side may also be constituted by a system including a steam turbine using steam as the working fluid F2.

In the circulating system 3a on the turbine side, as illustrated in FIG. 1, a working fluid circulation channel 12, the heat exchanger 14, the turbine 15, a power generator 16, a condenser 17, a cooling tower 18, a cooling water transfer pump 19, and a working fluid transfer pump 20 are provided. The turbine 15 is a drive mechanism to drive the power generator 16 and operates by the working fluid F2.

The working fluid circulation channel 12 constitutes a channel where the working fluid F2 flows from the turbine 15 and flows back to the turbine 15 through the condenser 17, the working fluid transfer pump 20, and the heat exchanger 14. The working fluid F2 that is pressurized by the working fluid transfer pump 20 is transferred to the heat exchanger 14. In the heat exchanger 14, heat exchange is performed between the heating medium F1 heated by at least the solar heat collector 7 and the working fluid F2. That is, in the heat exchanger 14, the working fluid F2 is heated by heat of the heating medium F1, while the heating medium F1 is cooled.

The working fluid F2 heated in the heat exchanger 14 flows into the turbine 15 through the high pressure side. The turbine 15 rotates by motive power obtained by the working fluid F2. A rotation shaft of the turbine 15 is coupled to the power generator 16. The power generator 16 is driven by means of the rotation shaft of the turbine 15, to thereby perform power generation. The solar thermal power generation apparatus 3 has a time delay of several minutes or so between heat input and power generation. That is, a time delay is created while heat input is performed by heating the heating medium F1, the heat of the heating medium F1 is transmitted to the working fluid, the turbine 15 operates by the inflow of the working fluid F2, and thereby power generation is performed by the power generator 16.

The working fluid F2 discharged from the turbine 15 on the low pressure side is in a gas state mainly and flows into the condenser 17. The discharged working fluid F2 is cooled by a cooling water in the condenser 17 to turn into a liquid to be led to the working fluid transfer pump 20. The cooling water flows between the condenser 17 and the cooling tower 18 by the cooling water transfer pump 19 to circulate therebetween.

Next, the electrothermal converting unit 30 provided in the power generation system 1 in this embodiment will be explained.

As illustrated in FIG. 1 and FIG. 2, the electrothermal converting unit 30 converts part of electric power generated by the wind power generation apparatus 2 into heat to heat the heating medium F1. In the wind power generation apparatus 2, a power generation amount greatly varies (fluctuates) depending on the scale of wind power that the wings 2a receive. Therefore, the electrothermal converting unit 30 smoothes generated electric power having large fluctuations to output the smoothed electric power to an electric distribution system.

As described above, the solar thermal power generation apparatus 3 has a time delay of several minutes or so between heat input and power generation. By means of this characteristic, the electrothermal converting unit 30 extracts a high-frequency component higher than a predetermined frequency (a relatively fast output fluctuation component) from the electric power generated by the wind power generation apparatus 2 and supplies the extracted high-frequency component electric power to the heater 5 to heat the heating medium F1.

Concretely, the electrothermal converting unit 30, as illustrated in FIG. 2, includes: a current transformer 23 (CT: Current Transformer); an electric power converting section 33; and an electric power conversion control section 31, in addition to the above-described heater 5.

The electric power converting section 33 converts (part) of the electric power output by the wind power generation apparatus 2 to electric power to drive the heater 5. Specifically, the electric power converting section 33 includes what is called an inverter power supply circuit 24 in a pulse width modulation (PWM: Pulse Width Modulation) control system.

Figure 3:
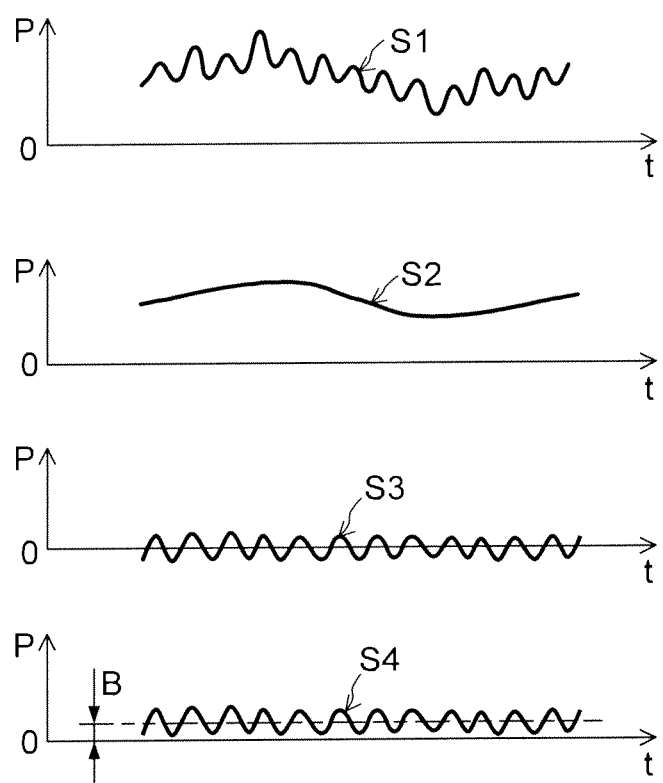
FIG. 3 is a waveform chart of each signal to be transmitted to the electrothermal converting unit in the power generation system according to the first embodiment.

The current transformer 23 measures the alternating-current electric power output from the power conditioner 22 of the wind power generation apparatus 2. Then, as illustrated in FIG. 3, the current transformer 23 inputs a signal S1 of this measurement to the electric power conversion control section 31.

The electric power conversion control section 31 controls an operation of the electric power converting section 33 provided with the inverter power supply circuit 24 so that the high-frequency component of the generated electric power of the wind power generation apparatus 2 may be converted into electric power to drive the heater 5.

Here, the electric power conversion control section 31 includes: a high-pass filter 26; an adder 29; and a function unit 32, as illustrated in FIG. 2.

The high-pass filter 26 of the electric power conversion control section 31 is constituted by combining a smoothing filter 27 (a low-pass filter) and a subtracter 28.

The signal S1 output from the current transformer 23 is input to the smoothing filter 27 and the subtracter 28 in the high-pass filter 26.

With regard to an output of the smoothing filter 27, as illustrated in FIG. 3, a signal S2 obtained by removing the high-frequency component from the signal S1 (a low-frequency component) is output.

The subtracter 28, as illustrated in FIG. 2 and FIG. 3, outputs a signal S3 obtained by subtracting the signal S2 from the signal S1 (a difference signal).

That is, the high-pass filter 26 (the subtracter 28) outputs the high-frequency component of the signal S1 input from the current transformer 23. Here, in order to extract the previously described high-frequency component (the relatively fast output fluctuation component) from the electric power generated by the wind power generation, a time constant smaller than, for example, 1 minute that corresponds to this usage is set in the high-pass filter 26.

The adder 29, as illustrated in FIG. 2 and FIG. 3, outputs a signal S4 obtained by adding a heater input bias B with a value set beforehand to the signal S3 output from the subtracter 28. In order to enable the control by the previously described inverter power supply circuit 24, the adder 29 obtains the signal S4 by adding the heater input bias B to the signal S3 so that a negative component lower than a reference potential (for example, 0 V) may be shifted to a component on the positive side, as illustrated in FIG. 3. That is, a signal value of the signal S4 becomes larger than 0.

To the function unit 32, the signal S4 as a variable is input from the adder 29 as illustrated in FIG. 2. Then, the function unit 32 converts the input signal S4 to a signal S5 corresponding to the inverter power supply circuit 24 side (changes the level or the like of the signal, for example). Then, the function unit 32 outputs the converted signal S5 (a function).

In the electric power converting section 33, the inverter power supply circuit 24 performs PWM control based on the signal S5 output by the function unit 32. Thereby, the inverter power supply circuit 24 converts the high-frequency component of the generated electric power output from the power conditioner 22 of the wind power generation apparatus 2 (the output fluctuation component) into the driving electric power to drive the heater 5. Then, the heater 5 is driven by the driving electric power supplied from the inverter power supply circuit 24. Thereby, the heating medium F2 flowing through the heating medium circulation channel 10 is heated.

Thermal energy of the heating medium F1 heated in this manner is effectively used as energy for power generation performed by the solar thermal power generation apparatus 3. On the other hand, as illustrated in FIG. 2, the electric power smoothed by removing the high-frequency component (the output fluctuation component) from the generated electric power output from the power conditioner 22 of the wind power generation apparatus 2 is increased in voltage to a predetermined voltage via a transformer 25 to then be transmitted to the electric distribution system (an electric power system).

Here, the time constant of the high-pass filter 26 will be explained with reference to FIG. 4.

Figure 4:
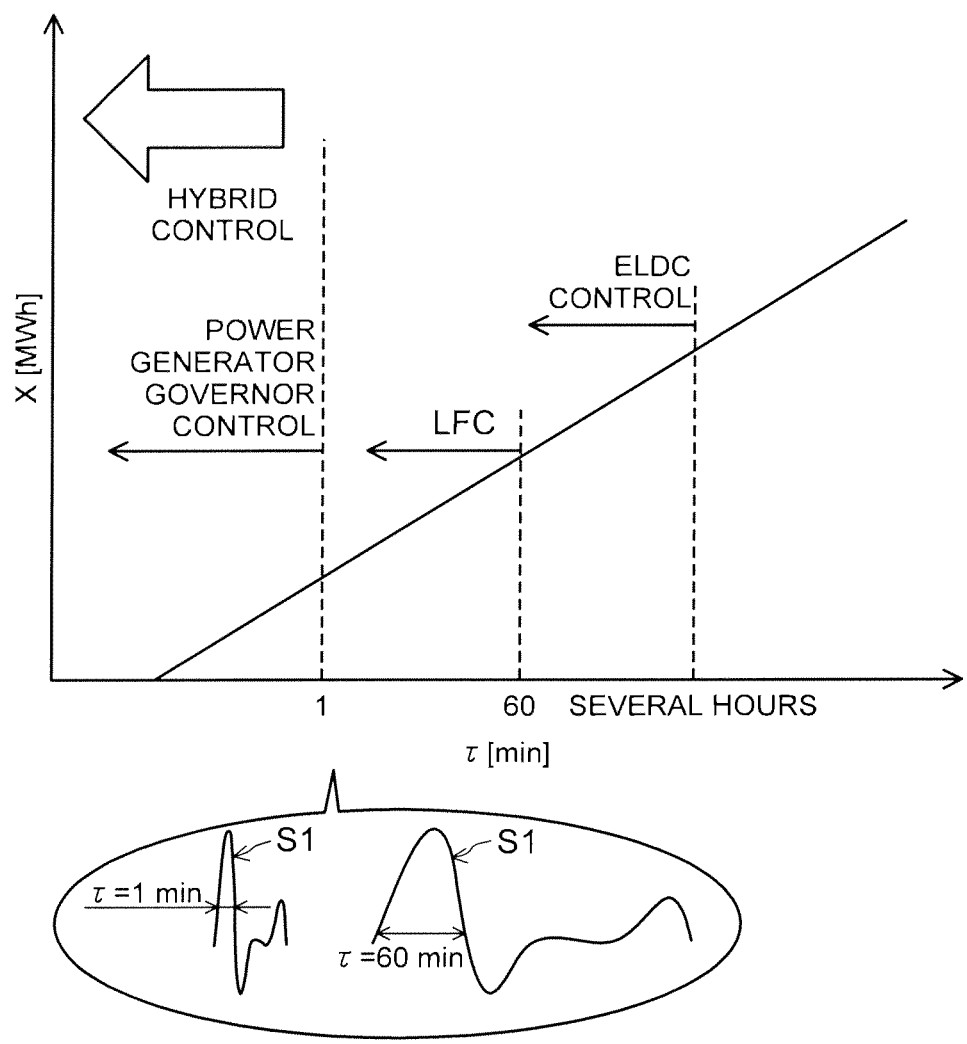
FIG. 4 is a view used for explaining a time constant set in a high-pass filter provided in the electrothermal converting unit in the power generation system according to the first embodiment.

FIG. 4 is a view illustrating the relationship between a time constant τ of the high-pass filter 26 (a fluctuation time period of generated electric power) and an adjustable width of rated power generation output. In FIG. 4, the horizontal axis indicates the time constant τ (the fluctuation time period of generated electric power), and the vertical axis indicates an adjustable width X of rated power generation output. Further, in FIG. 4, characteristics of power generator governor control (feedback control of a rotor rotation speed of a power generator), LFC (Load Frequency Control/load frequency control), ELDC (Economic Load Dispatch Control), and conventional hybrid control (hybrid power generation control) including power generation using renewable energy are illustrated as examples.

As is clear from FIG. 4, in the power generation system 1 in this embodiment, the time constant τ of the high-pass filter 26 is set to a value smaller than 1 minute, thereby making it possible to suppress generation of the fluctuation component of the generated electric power and to output stable generated electric power with reduced fluctuations.

As above, in the power generation system 1 in this embodiment, the fluctuation component of the electric power generated by the wind power generation apparatus 2 is converted into the thermal energy used for power generation on the solar thermal power generation apparatus 3 side. Therefore, in this embodiment, it is possible to effectively use the electric power obtained by the wind power generation and to output stable electric power with suppressed fluctuations. Further, in the power generation system 1 in this embodiment, it is possible to smooth the generated electric power by using the heater 5 substantially. Therefore, in this embodiment, it is possible to reduce a running cost as compared to the case where a storage battery with a durability problem is used for smoothing of generated electric power.

Second Embodiment

There will be explained a second embodiment with reference to FIG. 5.

Figure 5:
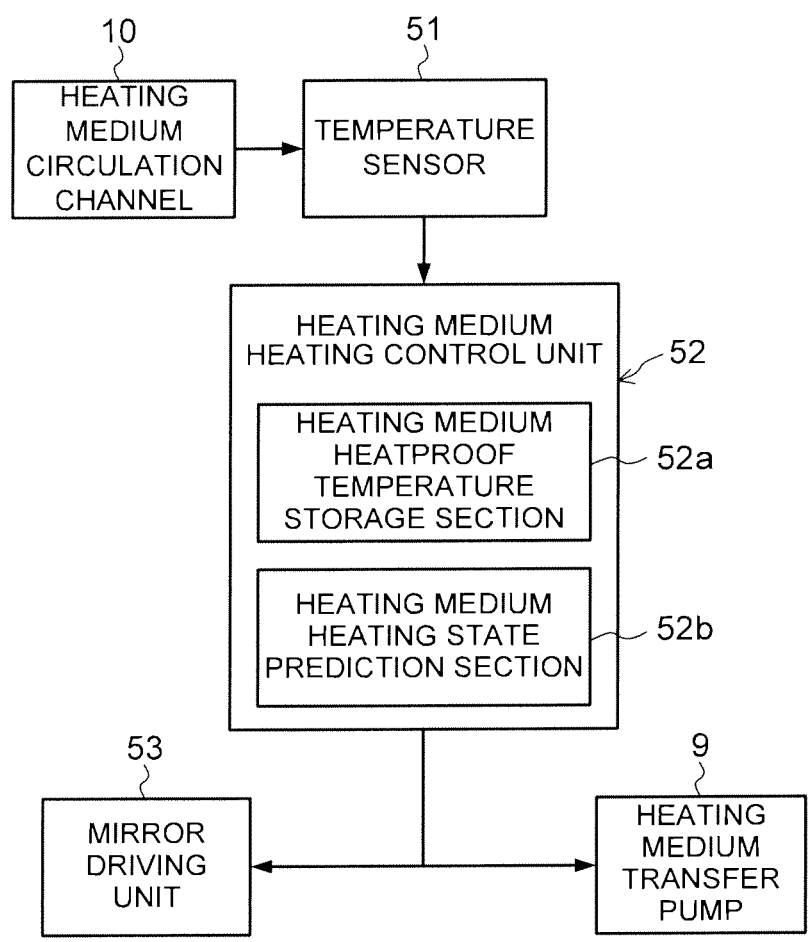
FIG. 5 is a block diagram functionally illustrating a temperature control system of a heating medium in a power generation system according to a second embodiment.

As illustrated in FIG. 5, a power generation system in this embodiment further includes: as a temperature control system of the heating medium F1, a temperature sensor 51; a heating medium heating control unit 52; and a mirror driving unit, (which is not illustrated in the first embodiment), 53, in addition to the constitution of the power generation system 1 according to the first embodiment.

The temperature sensor 51 detects a temperature of the heating medium F1 circulating through the heating medium circulation channel 10. The temperature sensor 51 is installed at the heating medium circulation channel 10 (see FIG. 1). For example, the temperature sensor 51 is installed on a downstream side (a subsequent stage side) of the solar heat collector 7, on a downstream side of the heater 5, or the like. Practically, the temperature sensor 51 is installed at the position where the heating medium F1 becomes the highest temperature on the entire path of the heating medium circulation channel 10. The temperature sensor 51, for example, indirectly detects the temperature of the heating medium F1 by detecting a surface temperature of the pipe, for example, or the like constituting the heating medium circulation channel 10. Additionally, it is also possible that the temperature sensor 51 is inserted into the heating medium circulation channel 10 to directly detect the temperature of the heating medium F1.

The heating medium heating control unit 52 controls one or both of the mirror driving unit 53 and the heating medium transfer pump 9 based on a detection result of the temperature sensor 51. More specifically, the heating medium heating control unit 52 includes: a heating medium heatproof temperature storage section 52a; and a heating medium heating state prediction section 52b.

The heating medium heatproof temperature storage section 52a stores a heatproof temperature of the heating medium F1 (a temperature capable of obtaining a physical property as an oil) therein.

The heating medium heating state prediction section 52b predicts (determines) whether or not the temperature (the maximum temperature) of the heating medium F1 detected by the temperature sensor 51 exceeds a threshold value temperature with, for example, a predetermined margin secured with respect to the heatproof temperature of the heating medium F1.

When the maximum temperature of the heating medium F1 detected by the temperature sensor 51 is predicted to exceed the threshold value, the heating medium heating control unit 52 controls the mirror driving unit 53 so that each focal position of the mirrors 6 where sunlight is collected may deviate from, for example, the center core position of the pipe 8. Besides, the heating medium heating control unit 52 controls the drive of the heating medium transfer pump 9 so that a transfer speed of the heating medium F1 circulating through the heating medium circulation channel 10 may increase. The heating medium heating control unit 52 may perform one of the control of the mirror driving unit 53 and the control of the heating medium transfer pump 9, or may also perform the both. By these controls, the heating medium heating control unit 52 suppresses a temperature increase of the heating medium F1.

Thus, according to the power generation system in this embodiment, it is possible to suppress excessive heating in addition to the effect of the power generation system 1 according to the first embodiment. In this embodiment, physical destruction of the heating medium F1 and the like can be prevented.

Third Embodiment

Figure 6:
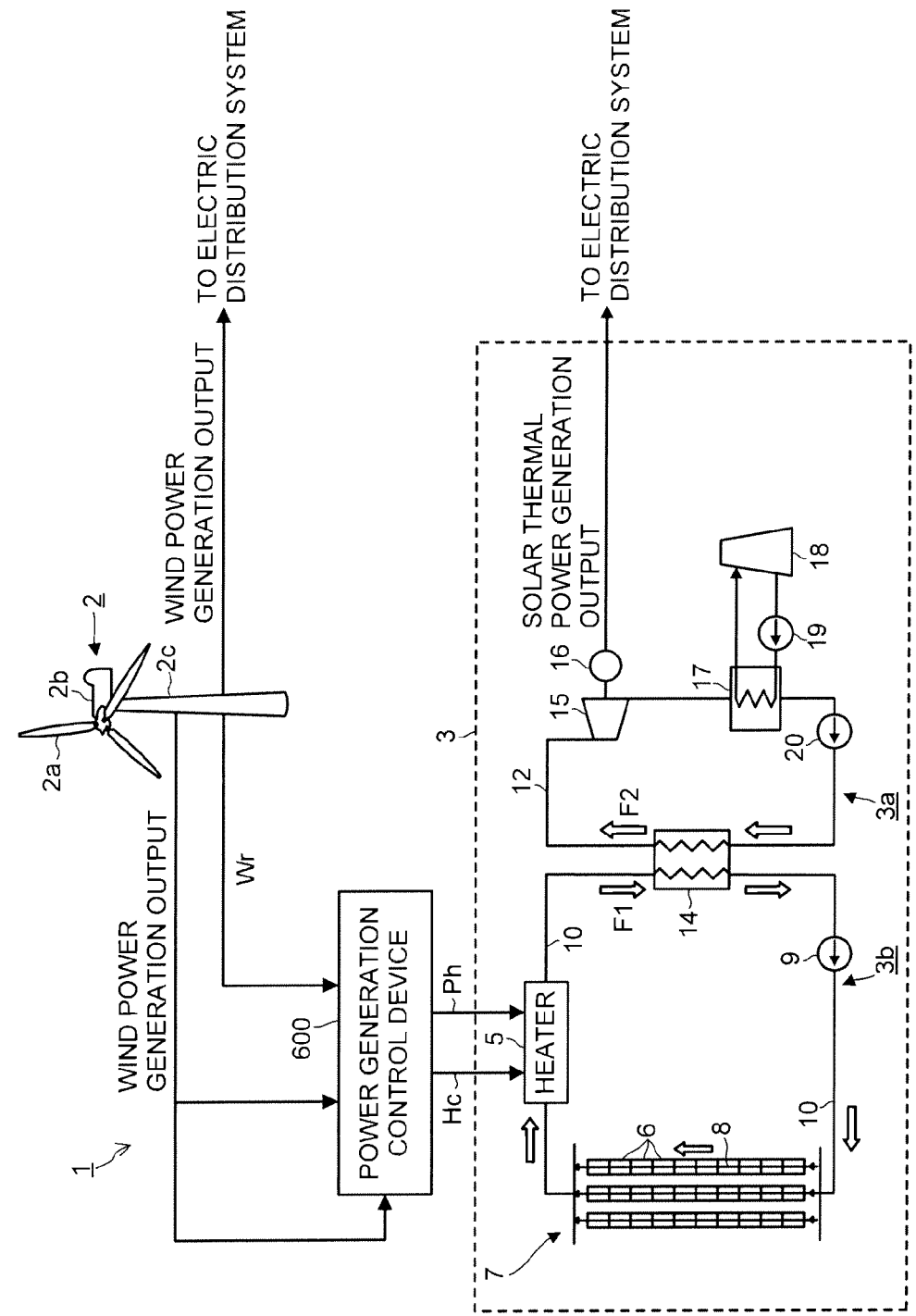
FIG. 6 is a constitution view of a power generation system according to a third embodiment.

FIG. 6 is a view illustrating a constitution of a power generation system according to a third embodiment.

As illustrated in FIG. 6, a power generation system 1 in this embodiment is a power generation system in which wind power generation to generate electric power by rotation of a windmill and solar thermal power generation in which the heating medium F1 circulating through the heating medium circulation channel 10 including the pipe 8 is heated by heat collected by the solar heat collector 7 and the heated heating medium F1 is used for power generation are combined. That is, the power generation system 1 is a hybrid power generation system in which the wind power generation apparatus 2 and the solar thermal power generation apparatus 3 are connected, similarly to the case of the above-described embodiments. In this embodiment, descriptions of portions overlapping the above-described embodiments are omitted as necessary. Incidentally, the number of the wings 2a is set to three for convenience of explanation only in this embodiment, but the number is not limited to this.

In this embodiment, inside the nacelle 2b or the tower 2c, a rotary encoder (whose illustration is omitted) is housed. The rotary encoder measures the rotation speed of the rotor to output the resultant as a windmill rotation speed Wr.

Further, in this embodiment, the heater 5 is driven by electric power (heater driving electric power Ph) supplied from a power generation control device 600, for example.

There will be explained details of the power generation control device 600 with reference to FIG. 7 to FIG. 9.

Figure 7:
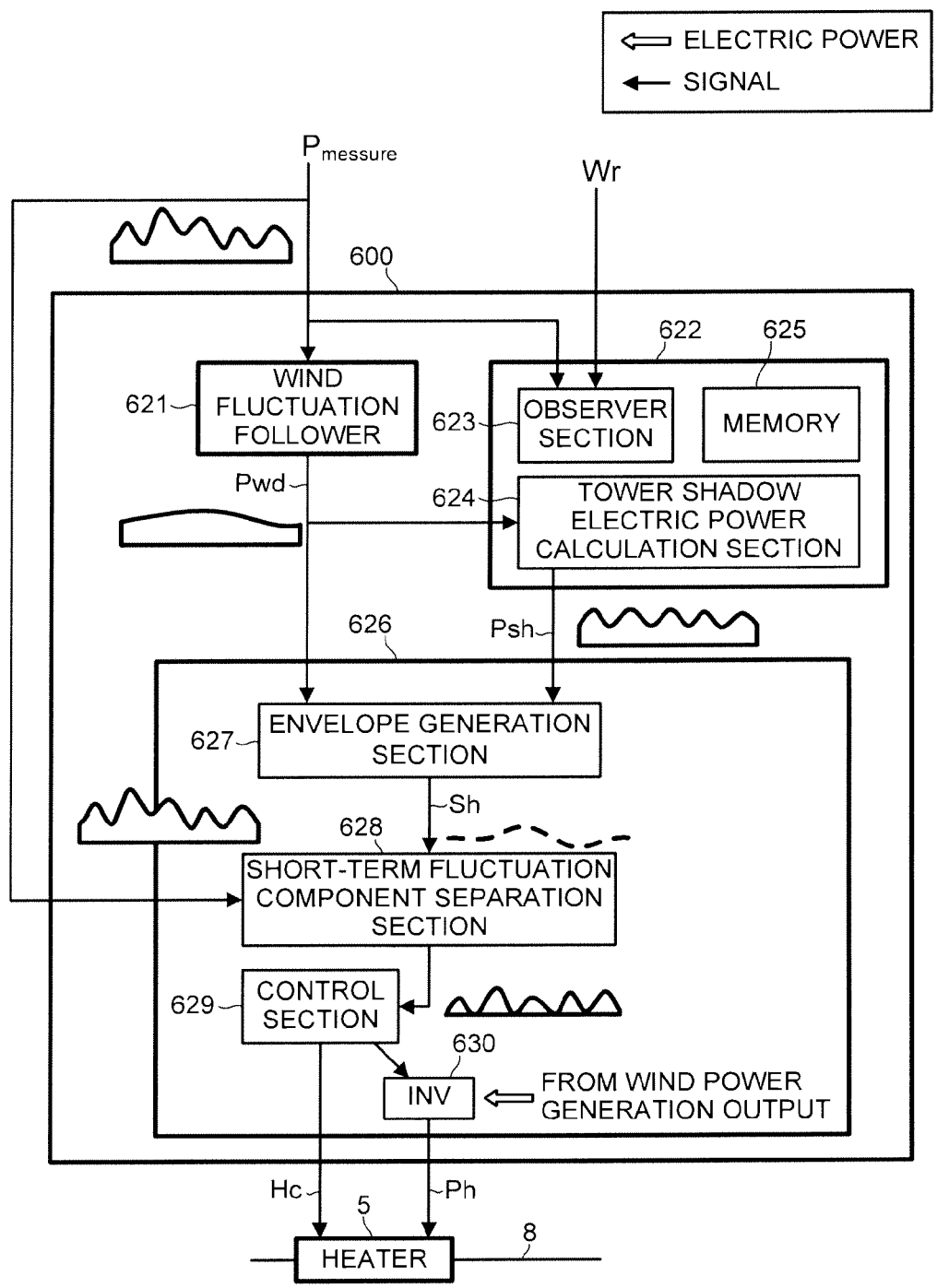
FIG. 7 is a view illustrating a constitution of a power generation control device in the power generation system according to the third embodiment.
Figure 8:
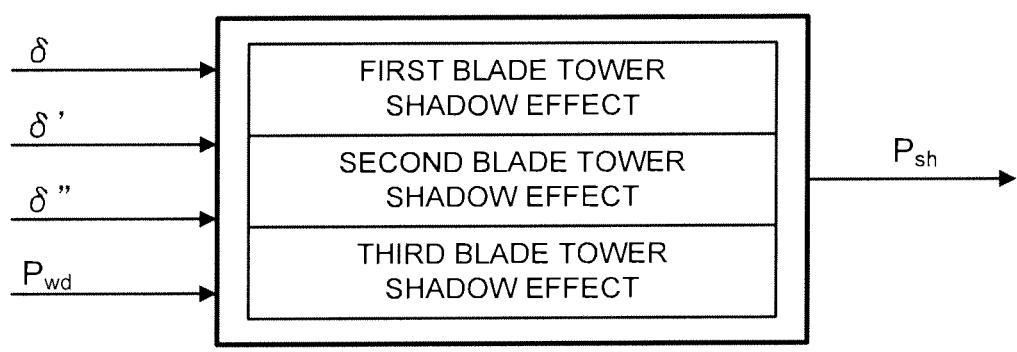
FIG. 8 is a view used for explaining how tower shadow effect electric power is calculated in the power generation system according to the third embodiment.

As illustrated in FIG. 7, the power generation control device 600 includes: a wind fluctuation follower 621 (a smoothed electric power signal generation unit); a tower shadow effect observer 622 (a tower shadow effect electric power generation unit); and a short-term fluctuating electric power extraction unit 626.

The wind fluctuation follower 621 is a secondary delay filter for wind power generated electric power containing fluctuations (to be referred to as "windmill electric power Pmessure" hereinafter) measured by the wind power generation apparatus 2. Here, the wind fluctuation follower 621 is explained on the condition that it is a secondary filter, but it is not limited to this. The wind fluctuation follower 621 smoothes the windmill electric power Pmessure by (Expression 1) below, to thereby generate smoothed electric power Pwd (a smoothed electric power signal) being smoothed wind power generation output and output it.

[Mathematical expression 1]

$$P_{wd} = \frac{1}{(1+Ts)^2} P_{measure} \quad \text{(Expression 1)}$$

The delay filter is constituted by, for example, a low-pass filter, and the like. The delay filter has a time constant not causing a tower shadow effect. Concretely, the delay filter has a time constant of 1 second to 60 seconds or so, for example, and delays and smoothes power generation output of the wind power generation with this time constant to output it.

The tower shadow effect observer 622 includes: as a rotation angle observation section, an observer section 623; a tower shadow effect electric power calculation section 624; and a memory 625.

The tower shadow effect observer 622 obtains a torque reduction amount of which torque reduces when each of the wings 2a of the rotating windmill passes by the tower 2c, based on both the windmill rotation speed Wr measured by using the rotary encoder and previously stored design data (blade model) expressing the relationship between the wing 2a of the windmill and the tower 2c supporting the windmill. Then, the tower shadow effect observer 622 generates tower shadow effect electric power Psh from the obtained torque reduction amounts of the three wings 2a and the smoothed electric power Pwd generated by the wind fluctuation follower 621.

The memory 625 stores wind power generation facility data and calculation expressions (Expression 1 to Expression 4, and the like) therein. The memory 625 stores, as the wind power generation facility data, the design data such as the wings 2a of the windmill, the tower 2c supporting the windmill, the torque generated by rotation of the wing 2a, and generated electric power generated by rotation of the wing 2a, for example, therein. The design data contains, for example, data expressing the positional relationship between the wing 2a of the windmill and the tower 2c supporting the windmill, a blade model being a program simulating the rotation of the wing 2a of the windmill, and the like. The blade model simulates a mechanism in which when the rotating wing 2a overlaps the tower 2c in a direction along the rotation shaft, the torque reduces and the power generation output reduces.

The observer section 623 calculates (estimates) a rotation angle δ of the wing 2a of the windmill by using the measured windmill electric power Pmessure and the windmill rotation speed Wr. An angle at which the wing 2a rotates with, for example, a standing direction of the tower 2c (a vertical direction) or a horizontal direction set to 0° is The tower shadow effect electric power calculation section 624 calculates (estimates) the tower shadow effect electric power Psh being electric power by the tower shadow effect from the rotation angle δ calculated by the observer section 623 and the smoothed electric power Pwd obtained by the wind fluctuation follower 621.

Specifically, the tower shadow effect electric power calculation section 624 calculates timing (time) at which the wing 2a of the windmill goes behind the tower 2c. Then, the tower shadow effect electric power calculation section 624 calculates a torque reduction at the calculated timing and calculates a reduction amount of a power generation amount with the calculated torque reduction.

The tower shadow effect electric power calculation section 624, in order to calculate the tower shadow effect electric power Psh, first calculates (estimates) a reduction in electric power caused by each of the three wings 2a of the windmill passing by the position of the tower 2c.

The reduction in electric power made by electric power reducing when the wing 2a of the rotating windmill passes by the tower 2c is expressed by a cosine function (cos θ).

Further, the power generation amount of the wind power generation can be approximated by a total value Ptw of electric powers generated by using the respective wings 2a with (Expression 2) below.

[Mathematical expression 2]

$$P_{tw} = T_e \cdot \omega = \frac{1}{3}\left\{\left(\left(1-\cos\left(\frac{\delta}{\varepsilon}\right)\right) \ldots |\delta| < \frac{\pi}{2}\varepsilon\right) + \\ 1 \ldots \text{other wise} \right.$$
$$\left(\left(1-\cos\left(\frac{\delta'}{\varepsilon}\right)\right) \ldots |\delta'| < \frac{\pi}{2}\varepsilon\right) + \\ 1 \ldots \text{other wise}$$
$$\left.\left(\left(1-\cos\left(\frac{\delta''}{\varepsilon}\right)\right) \ldots |\delta''| < \frac{\pi}{2}\varepsilon\right)\right\} T_{wind} \cdot \omega \\ 1 \ldots \text{other wise}$$

(Expression 2)

Here, ε represents a width of the tower 2c, δ represents a rotation angle of the single wing 2a constituting the windmill. Twind represents torque of the windmill, and ω represents a rotation angle speed. The rotation angle δ can be expressed by (Expression A) below.

[Mathematical Expression 3]

$$\delta = \int \omega dt \quad \text{(Expression A)}$$

Incidentally, δ' and δ" in (Expression 2) above represent rotation angles of the other wings 2a constituting the windmill. The three wings 2a are disposed at regular intervals in a rotation direction. Therefore, δ' and δ" become an angle obtained by subtracting 120 degrees from δ and an angle obtained by subtracting 240 degrees from δ respectively. Further, ε represents a range affected by the tower shadow effect, namely represents the width of the tower 2c, and is a parameter determined by the thickness of the tower 2c.

With respect to each term inside parentheses in (Expression 2), the upper stage portion (the portion in which "(1−cos(δ/ε))" and the like are described) expresses the case of a time period during which the wing 2a passes by the tower 2c. Then, the lower stage portion (the portion in which "1 . . . otherwise" is described) expresses the case of a time period other than the time period during which the wing 2a passes by the tower 2c. As is clear from (Expression 2), in the time period during which the wing 2a passes by the tower 2c, the power generation output reduces, while in the other time period, the power generation output does not change.

Concretely, in the time period during which the wing 2a passes by the tower 2c, as described in the upper stage portion of each term inside parentheses of (Expression 2), the absolute values of the rotation angles δ, δ', and δ" of the respective wings 2a are each smaller than a value expressed by ((π/2)ε), and the values inside the parentheses become (1−cos(δ/ε)), (1−cos(δ'/ε)), and (1−cos(δ"/ε)). In contrast to this, in the time period other than the time period during which the wing 2a passes by the tower 2c, as described in the lower stage portion in which "1 . . . otherwise" is described of each term inside parentheses of (Expression 2), the values inside the parentheses are each "1." This is because when the wings 2a each pass by an end portion of the tower 2c, the rotation angles δ, δ', and δ" of the respective wings 2a are each become (π/2)ε, and thus inside the parentheses, the values of cos(δ/ε), cos(δ'/ε) and cos(δ"/ε) each become 0 (that is, δ=δ'=δ"=(π/2)ε is satisfied and cos(δ/ε)=cos(δ'/ε)=cos(δ"/ε)=0 is satisfied). That is, in the time period other than the time period during which the wing 2a passes by the tower 2c, no tower shadow effect appears.

Of the power generation amount of the wind power generation expressed by (Expression 2), the reduction amount of electric power reduced by the tower shadow effect can be calculated (estimated) by (Expression 3) below.

[Mathematical expression 4]

$$P_{sh} = \frac{1}{3}\left\{\left(\begin{matrix}-\cos\left(\frac{\delta}{\varepsilon}\right) & \dots & |\delta| < \frac{\pi}{2}\varepsilon \\ 0 & \dots & \text{other wise}\end{matrix}\right) + \left(\begin{matrix}-\cos\left(\frac{\delta'}{\varepsilon}\right) & \dots & |\delta'| < \frac{\pi}{2}\varepsilon \\ 0 & \dots & \text{other wise}\end{matrix}\right) + \left(\begin{matrix}-\cos\left(\frac{\delta''}{\varepsilon}\right) & \dots & |\delta''| < \frac{\pi}{2}\varepsilon \\ 0 & \dots & \text{other wise}\end{matrix}\right)\right\}T_{wind} \cdot \omega$$

(式 3)

(Expression 3)

As expressed in (Expression 3), the tower shadow effect can be approximately obtained by the sum of three functions included in the right side. This is illustrated in FIG. 8. In (Expression 3) as well, in each term inside parentheses, the upper stage portion expresses the case of a time period during which the wing 2a passes by the tower 2c and the lower stage portion expresses the case of a time period other than the time period during which the wing 2a passes by the tower 2c, similarly to (Expression 2). Incidentally, Expression (2) corresponds to the resultant obtained by subtracting the reduction in power generation amount caused by the tower shadow effect expressed by Expression (3) from the original power generation amount that is not affected by the tower shadow effect.

Next, there will be explained calculation operations (estimation processing) of the rotation angles δ, δ', and δ" of the windmill (the wings 2a) performed by the observer section 623.

As described above, as long as the rotation angle δ of the single wing 2a is calculated (estimated), the rotation angles δ' and δ" of the other two wings 2a can be calculated easily in a manner that the rotation angles δ' and δ" are moved from the rotation angle δ by 120 degrees and 240 degrees.

Figure 9:
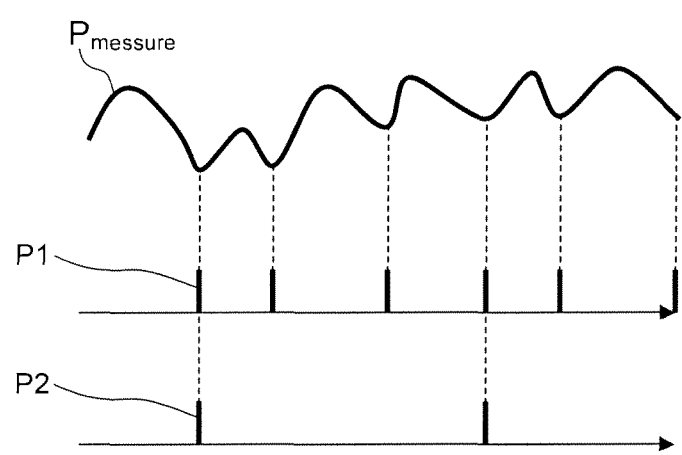
FIG. 9 is a view illustrating an operation to detect a fluctuation position in the power generation system according to the third embodiment.

In order to calculate (estimate) the rotation angle δ, the observer section 623, as illustrated in FIG. 9, passes an electric power fluctuation signal having a cycle of, for example, 1 second or so mainly in the measured windmill electric power Pmessure through a band-pass filter or high-pass filter, to thereby generate the short-term fluctuation component.

Then, the observer section 623 counts a point fluctuating in the direction in which electric power reduces by the tower shadow effect by a peak counter by using the obtained short-term fluctuation component to obtain peak counter output pulses P1.

Then, the observer section 623 counts one pulse by a δ counter for every three pulses counted by the peak counter and obtains δ counter output pulses P2, to thereby extract the timing at which the wing 2a passes by the tower.

An occurrence instant of the δ counter output pulse P2 output by the δ counter corresponds to an instant when it passes by δ=0.

Then, the rotation angle δ, as expressed in (Expression 4) below, is calculated (estimated) by integrating an angular speed ω of the windmill derived from the windmill rotation speed Wr (a measurement value) from the instant when it passes by δ=0.

[Mathematical Expression 5]

$$\delta = \int_{t_0}^{t} \omega dt \quad \text{(Expression 4)}$$

The short-term fluctuating electric power extraction unit 626 includes: an envelope generation section 627; a short-term fluctuation component separation section 628; a control section 629; an inverter 630 (to be referred to as "INV 630" hereinafter); and so on. The short-term fluctuating electric power extraction unit 626 extracts electric power of the short-term fluctuation component from the windmill electric power Pmessure.

The envelope generation section 627 generates an envelope Sh connecting lower limit values (minimum values) of the windmill electric power Pmessure to fluctuate for a short term, based on the tower shadow effect electric power Psh output from the tower shadow effect observer 622 and the smoothed output Pwd output from the wind fluctuation follower 621.

Concretely, the envelope generation section 627 obtains an electric power signal by adding the tower shadow effect electric power Psh to the original windmill electric power Pmessure. Then, the envelope generation section 627 subtracts amplitudes of the tower shadow effect electric power Psh from the obtained electric power signal, to thereby generate the envelope Sh.

That is, the envelope Sh is obtained by values obtained by subtracting half the amplitudes of the tower shadow effect electric power Psh from the smoothed output Pwd output from the wind fluctuation follower 621. The wind power generated electric power larger than the envelope Sh calculated as above is short-term output fluctuations that should be smoothed.

The short-term fluctuation component separation section 628 separates the short-term fluctuation component from the windmill electric power Pmessure by using the envelope Sh generated by the envelope generation section 627.

The INV 630 converts the short-term fluctuation component separated by the short-term fluctuation component separation section 628 into the heater driving electric power Ph to supply the converted heater driving electric power Ph to the heater 5. Thereby, the heater 5 is driven and the heating medium F1 flowing through the heating medium circulation path 10 is heated.

The control section 629 controls drivings of the heater 5 and the INV 630.

More concretely, the control section 629 detects the temperature of the heating medium F1 flowing through the pipe 8 of the solar heat collector 7 or the heating medium circulation path 10 by a thermometer (whose illustration is omitted). Then, the control section 629 stops the driving of the heater 5 by a heater control signal Hc when the temperature of the heating medium F1 exceeds a threshold value set beforehand. The control section 629 may also control the INV 630 to stop the driving when the temperature of the heating medium F1 exceeds the threshold value. Further, in order to limit the temperature of the heating medium F1 flowing through the heating medium circulation path 10 including the pipe 8, the control section 629 may also perform control to drive the mirror driving unit (whose illustration is omitted) of the solar heat collector 7, for example, to thereby move the focal point of the mirrors 8.

Hereinafter, there will be explained an operation of this embodiment with reference to FIG. 10 and FIG. 11.

Figure 10:
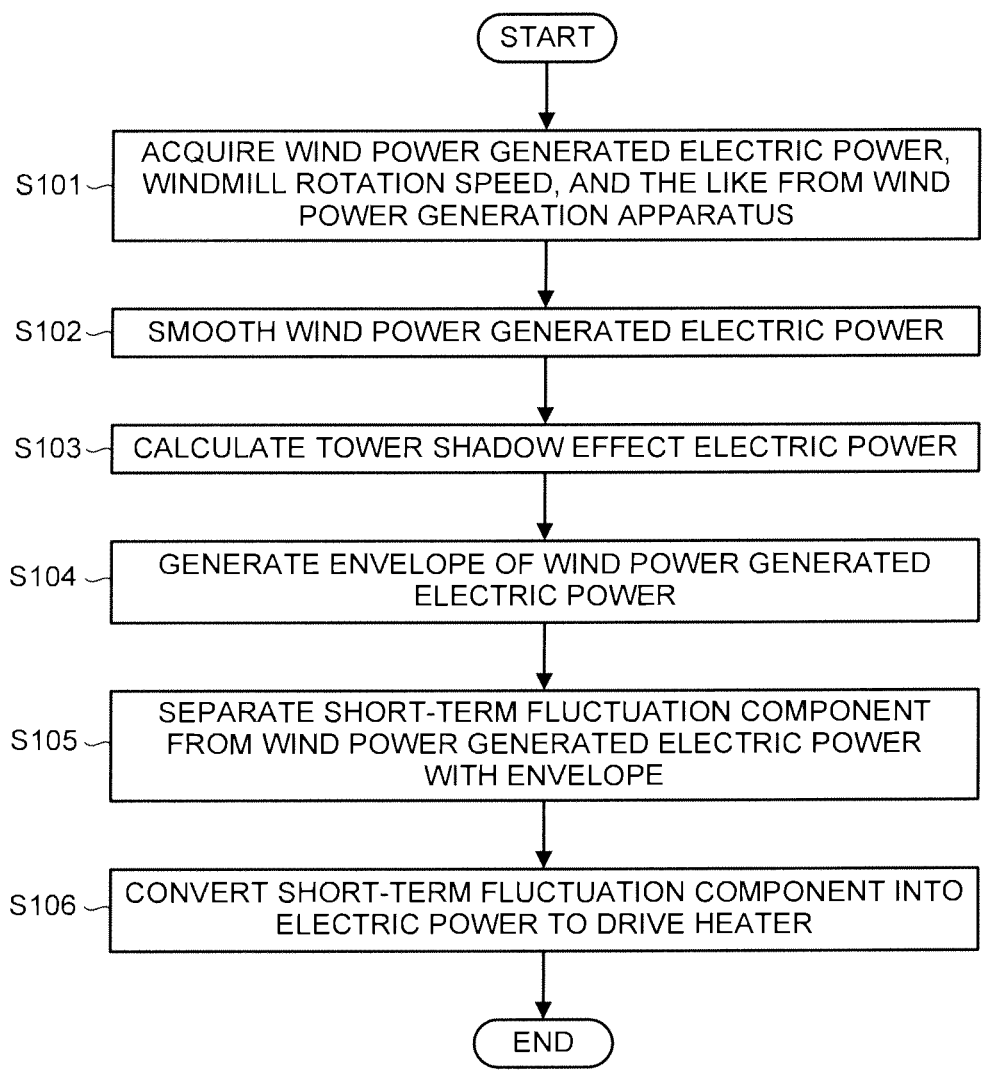
FIG. 10 is a flowchart illustrating an operation of the power generation system in the power generation system according to the third embodiment.

In this embodiment, in the power generation control device 600, the tower shadow effect observer 622 and the wind fluctuation follower 621 observe an operation state of the wind power generation apparatus 2, and detect (acquire) various data generated by wind power generation (the windmill electric power Pmessure, the windmill rotation speed Wr, and the like) (Step S101 in FIG. 10).

The wind fluctuation follower 621 smoothes the acquired windmill electric power Pmessure to generate the smoothed electric power Pwd, and outputs it to the short-term fluctuating electric power extraction unit 626 and the tower shadow effect observer 622 (Step S102).

In the tower shadow effect observer 622, the observer section 623 acquires the windmill rotation speed Wr to output it to the tower shadow effect electric power calculation section 624.

The tower shadow effect electric power calculation section 624 calculates the tower shadow effect electric power Psh by using the smoothed electric power Pwd input from the wind fluctuation follower 621, the windmill rotation speed Wr from the observer section 623, and the data in the memory 625 (the blade model, calculation expressions, and the like) (Step S103), and outputs the tower shadow effect electric power Psh to the short-term fluctuating electric power extraction unit 626.

Figure 11:
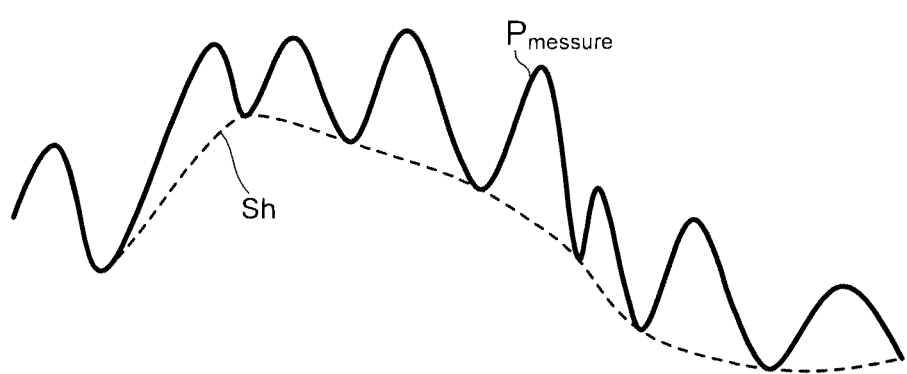
FIG. 11 is a view illustrating how an envelope is generated with respect to wind power generated electric power to fluctuate for a short term in the power generation system according to the third embodiment.

In the short-term fluctuating electric power extraction unit 626, the envelope generation section 627 generates, as illustrated in FIG. 11, the envelope Sh of the windmill electric power Pmessure from the smoothed electric power Pwd input from the wind fluctuation follower 621 and the tower shadow effect electric power Psh input from the tower shadow effect observer 622 (Step S104) to output the envelope Sh to the short-term fluctuation component separation section 628.

The short-term fluctuation component separation section 628 separates the short-term fluctuation component from the fluctuating windmill electric power Pmessure with the envelope Sh input from the envelope generation section 627 (Step S105), and outputs the separated short-term fluctuation component to the INV 630.

The INV 630 converts the short-term fluctuation component into the heater driving electric power Ph (Step S106), and supplies the heater driving electric power Ph to the heater 5.

As described above, according to this embodiment, in consideration of the tower shadow effect that the wing 2a of the wind power generation apparatus 2 approaches the tower 2c and the torque reduces, the short-term fluctuation component of the wind power generated electric power is calculated highly accurately. Then, the short-term fluctuation component is separated from the wind power generated electric power and is supplied to other power facilities (the heater 5 and the like). Thereby, it is possible to efficiently use the electric power obtained by the wind power generation.

Further, in this embodiment, the solar thermal power generation and the wind power generation are combined, and the high-frequency component of the wind power generated electric power that has been cut conventionally (a fast output fluctuation component for about several seconds or shorter of the wind power generation) is supplied to the solar thermal power generation apparatus. Therefore, it is possible to generate larger electric power and to achieve power generation efficiency improvement as the whole power generation system.

Further, the facilities such as the heater 5 do not deteriorate easily as compared to a storage battery and their initial cost and their maintenance cost are low, so that it is possible to achieve a cost reduction of the facilities rather than the case of using a storage battery.

As a result, it is possible to efficiently generate electric power at low cost without using a storage battery in the power generation by natural energy (renewable energy) such as the wind power generation and the solar thermal power generation.

Fourth Embodiment

[A] Overall Constitution

Figure 12:
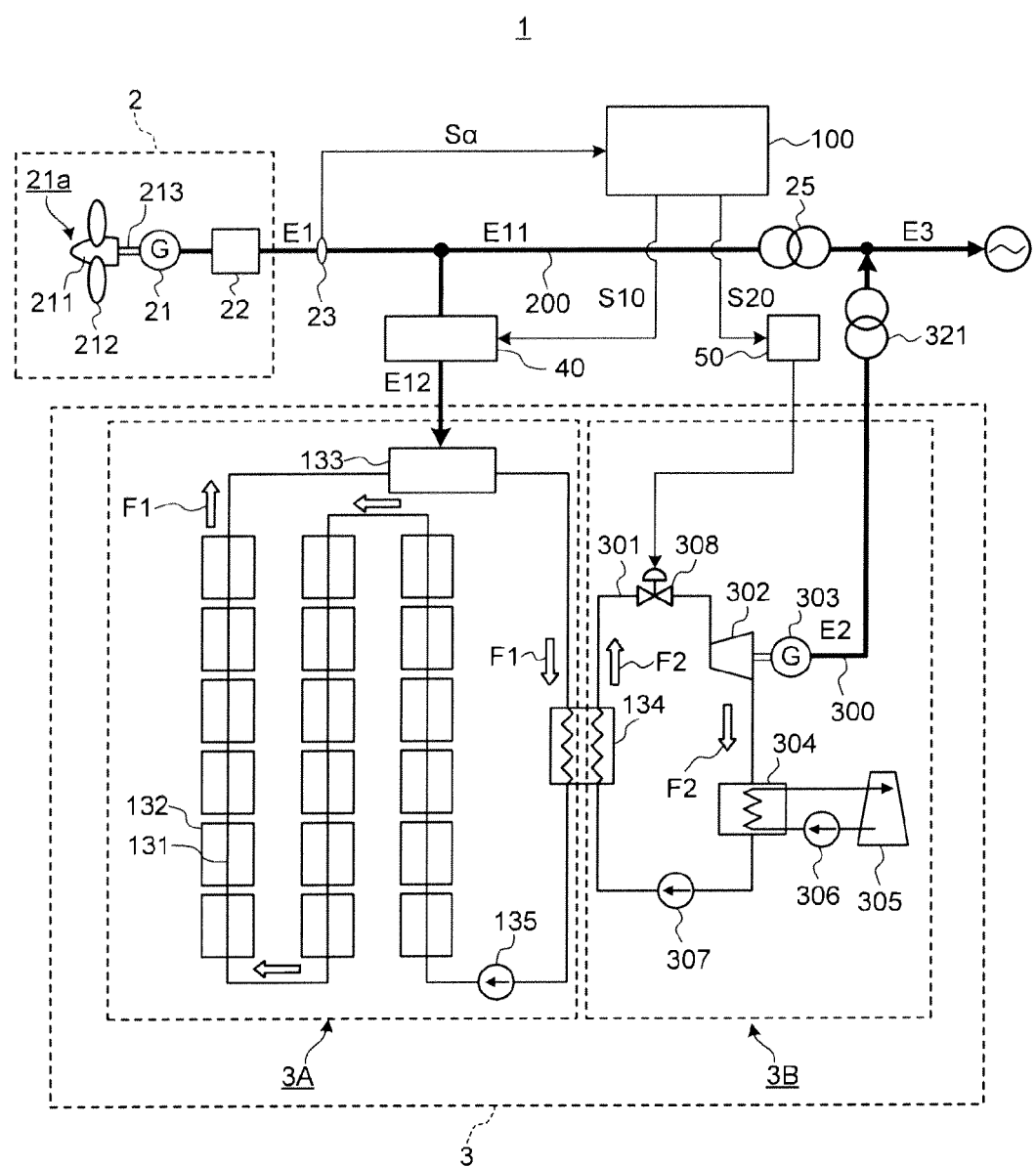
FIG. 12 is a conceptual diagram illustrating a concept of a power generation system according to a fourth embodiment.

FIG. 12 is a conceptual diagram illustrating a concept of a power generation system according to a fourth embodiment.

A power generation system 1, as illustrated in FIG. 12, includes: a wind power generation apparatus 2; a solar thermal power generation apparatus 3; an inverter 40; an output control device 50; and a control device 100. Hereinafter, there will be sequentially explained respective units constituting the power generation system 1.

[A-1] Wind Power Generation Apparatus 2

The wind power generation apparatus 2 includes: a propeller-type windmill; a rotor 21a; a power generator 21; and a power conditioner 22, as illustrated in FIG. 12.

Of the wind power generation apparatus 2, the rotor 21a includes: a hub 211; a plurality of blades 212 (wings); and a shaft 213. The rotor 21a is that the plural blades 212 are installed around the hub 211 in a rotation direction at regular intervals. Then, one end of the shaft 213 is fixed to the hub 211. The rotor 21a rotates about the shaft 213 as a rotation shaft. The rotor 21a is rotatably supported by a nacelle installed at an upper end portion of a tower, of which the illustration is omitted. The wind power generation apparatus 2 includes a propeller windmill.

Of the wind power generation apparatus 2, the power generator 21 is coupled to the shaft 213 of the rotor 21a and is driven by rotation of the shaft 213 to perform power generation.

Of the wind power generation apparatus 2, the power conditioner 22 is electrically connected to the power generator 21. The power conditioner 22 converts a frequency of electric power output by the power generator 21 and outputs the electric power to a first power transmission line 200.

Then, in the wind power generation apparatus 2, data of electric power E1 (first electric power) output from the power generator 21 via the power conditioner 22 are detected by using a current transformer 23, and the detected data are output to the control device 100 as a wind power generation output signal Sα.

Further, electric power E12 being part of the electric power E1 output by the wind power generation apparatus 2 is output to the solar thermal power generation apparatus 3 through the first power transmission line 200, and electric power E11 being the rest is output to an electric power system (an alternating-current electric power system) from the first power transmission line 200 via a transformer 25 (trans.).

[A-2] Solar Thermal Power Generation Apparatus 3

The solar thermal power generation apparatus 3 is a parabolic trough system, for example, and includes: a heat collection unit 3A; and a power generation unit 3B as illustrated in FIG. 12.

Of the solar thermal power generation apparatus 3, the heat collection unit 3A, as illustrated in FIG. 12, includes: a first pipe 131; curved mirrors 132; a heater 133; a heat exchanger 134; and a first pump 135, and heats a heating medium F1 by collecting solar heat.

Concretely, in the heat collection unit 3A, the heating medium F1 flows inside the first pipe 131. The heating medium F1 is heated by heat collected by sunlight collected to the first pipe 131 by the curved mirrors 132. Additionally, the heating medium F1 is further heated by the heater 133. Thereafter, the heated heating medium F1 flows into the heat exchanger 134. Then, the heating medium F1 is discharged from the first pump 135. In this manner, the heating medium F1 circulates inside the first pipe 131.

In the heat collection unit 3A, an actuator to rotationally move the curved mirrors 132 is installed, of which the illustration is omitted. The actuator rotates the curved mirrors 132 according to a control signal (whose illustration is omitted) output from the control device 100, and thereby a relative angle between a heat collecting surface of the curved mirrors 132 and the sun is changed. According to a control signal calculated based on the temperature of the heating medium F1, for example, the curved mirrors 132 are rotationally moved, and thereby the temperature of the heating medium F1 is controlled.

Of the solar thermal power generation apparatus 3, the power generation unit 3B, as illustrated in FIG. 12, includes: a second pipe 301; a turbine 302; a power generator 303; a condenser 304; a cooling tower 305; a second pump 306; a third pump 307; and a steam valve 308, and performs power generation by a working fluid F2 heat exchanged with the heating medium F1.

Concretely, in the power generation unit 3B, the working fluid F2 flows inside the second pipe 301. The working fluid F2 is heat exchanged with the heating medium F1 in the heat exchanger 134 and is heated. Then, the heated working fluid F2 flows into the inside of the turbine 302 via the steam valve 308, and a turbine rotor (whose illustration is omitted) rotates. Then, by the rotation of the turbine rotor, the power generator 303 performs power generation. Then, electric power E2 (second electric power) is output to the electric power system via a second power transmission line 300 from the power generator 303. Then, the working fluid F2 is discharged from the turbine 302, and then is condensed in the condenser 304. To the condenser 304, a cooling medium cooled in the cooling tower 305 is supplied by the second pump 306, and in the condenser 304, the working fluid F2 is condensed by the cooling medium. Then, the condensed working fluid F2 is discharged from the third pump 307, to thereby circulate inside the second pipe 301.

The solar thermal power generation apparatus 3 performs power generation as described above, to thus need a time for several minutes or so between heat input and power generation.

[A-3] Inverter 40 and Output Control Device 50

The inverter 40 is a semiconductor converter, and operates based on a control signal output by the control device 100. The output control device 50 controls the output of the power generation unit 3B.

Concretely, the inverter 40 receives a first control signal S10 from the control device 100. The inverter 40 converts the frequency of the electric power E1 output by the wind power generation apparatus 2 according to the first control signal S10, to thereby output the electric power E12 being part of the electric power E1 output by the wind power generation apparatus 2 to the heater 133 from the first power transmission line 200.

Further, the output control device 50 receives a second control signal S20 from the control device 100. The output control device 50 adjusts the output of the power generator 303 of the solar thermal power generation apparatus 3 by the main steam valve 308 according to the second control signal S20. That is, the output control device 50 adjusts the opening degree of the main steam valve 308 based on the second control signal S20, to thereby adjust the amount of the electric power E2 output by the power generator 303. The electric power E2 output by the power generator 303 of the solar thermal power generation apparatus 3 is output to a transformer 321 through the second power transmission line 300.

Then, this electric power E2 is output to the first power transmission line 200 via the transformer 321 to be combined with the electric power E11 obtained by subtracting the electric power E12 being part of the electric power E1 from the electric power E1 output by the wind power generation apparatus 2.

[A-4] Control Device 100

The control device 100, as illustrated in FIG. 12, receives the wind power generation output signal Sα from the current transformer 23 (a potential transformer). Then, the control device 100 outputs the first control signal S10 to the inverter 40 based on the wind power generation output signal Sα. Additionally, the control device 100 outputs the second control signal S20 to the output control device 50 based on the wind power generation output signal Sα.

Figure 13:
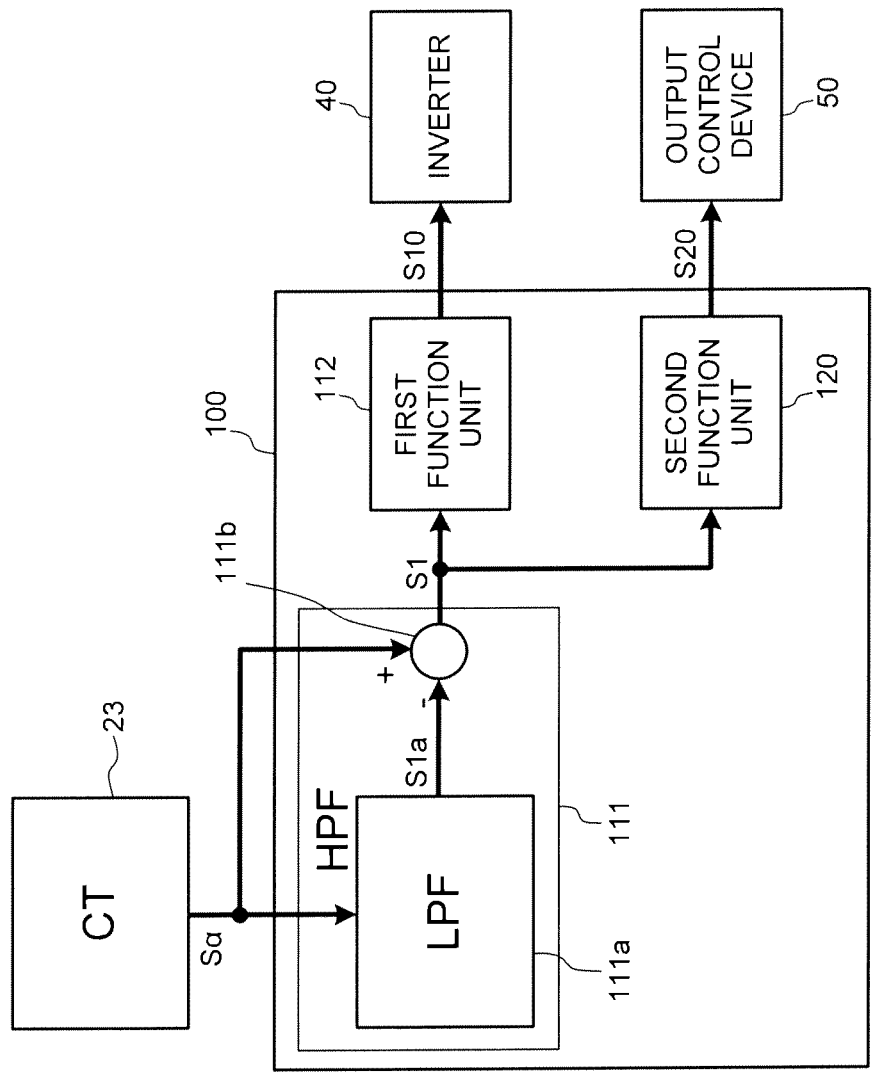
FIG. 13 is a block diagram illustrating a control device and members to perform input and output of data with the control device in the power generation system according to the fourth embodiment.

FIG. 13 is a block diagram illustrating the control device and members to perform input and output of data with the control device in the power generation system according to the fourth embodiment.

As illustrated in FIG. 13, the control device 100 includes: a high-pass filter 111; a first function unit 112 (a first control signal calculation unit); and a second function unit 120 (a second control signal calculation unit).

[A-4-1] High-Pass Filter 111

Of the control device 100, the high-pass filter 111, as illustrated in FIG. 13, receives the wind power generation output signal Sα from the current transformer 23. Then, the high-pass filter 111 high-pass filters the wind power generation output signal Sα and extracts a high-frequency component signal S1 contained in the wind power generation output signal Sα to output the high-frequency component signal S1.

Concretely, the high-pass filter 111, as illustrated in FIG. 13, includes: a low-pass filter 111a; and an adder-subtracter 111b. The low-pass filter 111a low-pass filters the wind power generation output signal Sα, to thereby calculate a low-frequency component signal S1a contained in the wind power generation output signal Sα. Then, the adder-subtracter 111b performs processing of subtracting the low-frequency component signal S1a from the wind power generation output signal Sα. In this manner, the high-pass filter 111 calculates the high-frequency component signal S1. The high-pass filter 111 preferably has a time constant smaller than 1 minute, similarly to the cases described in the above-described embodiments.

[A-4-2] First Function Unit 112

Of the control device 100, to the first function unit 112, as illustrated in FIG. 13, the high-frequency component signal S1 is input from the high-pass filter 111. Then, the first function unit 112 performs processing of calculating the first control signal S10 from the input high-frequency component signal S1 by using a previously stored function, and outputs the first control signal S10 to the inverter 40.

Figure 14:
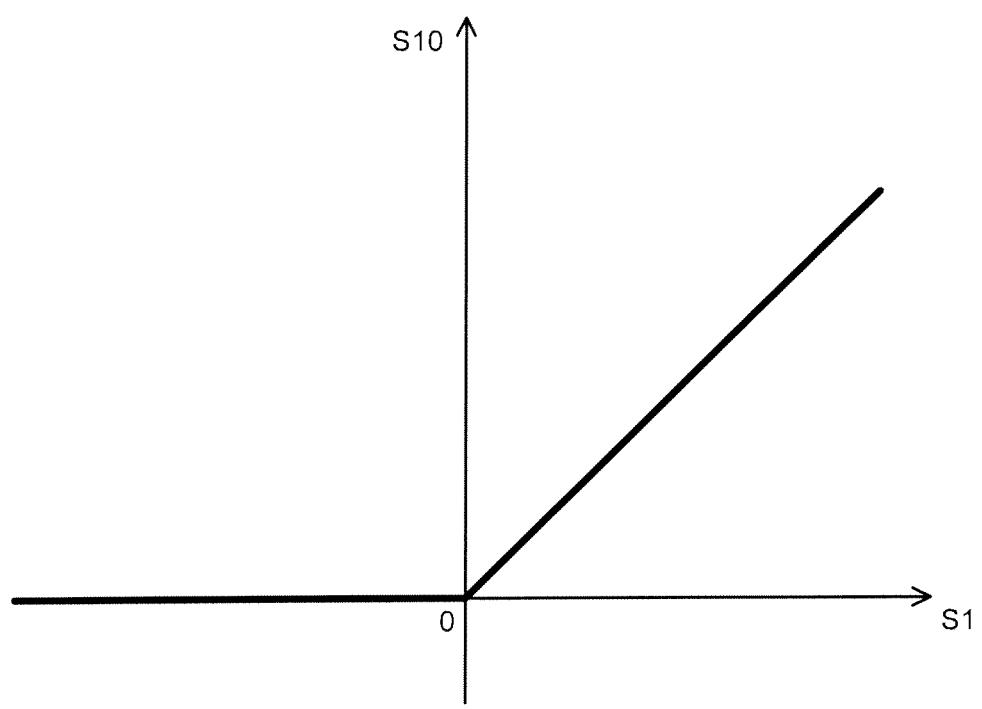
FIG. 14 is a view illustrating a function to be used in a first function unit in the power generation system according to the fourth embodiment.

FIG. 14 is a view illustrating the function to be used in the first function unit in the power generation system according to the fourth embodiment.

In FIG. 14, the horizontal axis indicates a value of the high-frequency component signal S1 to be input to the first function unit 112. Then, the vertical axis indicates a value of the first control signal S10 to be output from the first function unit 112.

As illustrated in FIG. 14, the first function unit 112 increases the value of the first control signal S10 to output in proportion to the absolute value of the high-frequency component signal S1 when the value of the input high-frequency component signal S1 is zero or more (positive) (in the case of S1≥0, S10=S1 is set, for example). On the other hand, when the value of the input high-frequency component signal S1 is less than zero (negative), the first function unit 112 decreases the value of the first control signal S10 to output to zero regardless of the value of the high-frequency component signal S1 (in the case of S1<0, S10=0·S1 is set).

As above, in this embodiment, the first function unit 112 is a first control signal calculation unit, and extracts a positive component from the high-frequency component signal S1, to thereby calculate the first control signal S10.

Incidentally, it is also possible to calculate the first control signal S10 by using a plurality of adder-subtracters to perform addition processing or subtraction processing on plural signals without using the first function unit 112.

[A-4-3] Second Function Unit 120

Of the control device 100, to the second function unit 120, as illustrated in FIG. 13, the high-frequency component signal S1 is input from the high-pass filter 111. Then, the second function unit 120 calculates the second control signal S20 from the input high-frequency component signal S1 by using a previously stored function, and outputs the second control signal S20 to the output control device 50.

Figure 15:
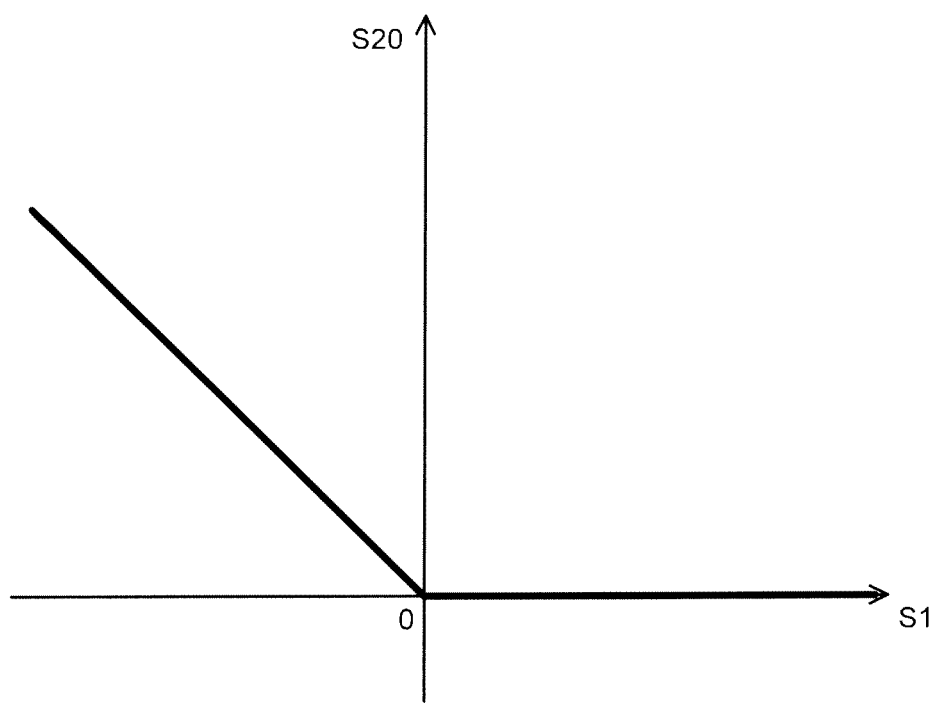
FIG. 15 is a view illustrating a function to be used in a second function unit in the power generation system according to the fourth embodiment.

FIG. 15 is a view illustrating the function to be used in the second function unit in the power generation system according to the fourth embodiment.

In FIG. 15, the horizontal axis indicates a value of the high-frequency component signal S1 to be input to the second function unit 120. Then, the vertical axis indicates a value of the second control signal S20 to be output from the second function unit 120.

As illustrated in FIG. 15, when the value of the input high-frequency component signal S1 is zero or more (positive), the second function unit 120 decreases the value of the second control signal S20 to output to zero regardless of the value of the high-frequency component signal S1 (in the case of S1≥0, S20=0·S1 is set, for example). On the other hand, when the value of the input high-frequency component signal S1 is less than zero (negative), the second function unit 120 increases the value of the second control signal S20 to output in proportion to the absolute value of the high-frequency component signal S1 (in the case of S1<0, S20=−S1 is set, for example).

As above, in this embodiment, the second function unit 120 is a second control signal calculation unit, and extracts a negative component from the high-frequency component signal S1, to thereby calculate the second control signal S20.

Incidentally, in the second function unit 120, it is also possible that the resultant obtained by further adding a fixed value as a bias to data extracting the negative component from the high-frequency component signal S1 is output to the output control device 50 as the second control signal S20 (that is, it is also possible that in the case of S1≥0, S20=0·S1+b1 is set, for example, and in the case of S1<0, S20=−S1+b1 (b1≥0 and in FIG. 15, b1=0) is set, for example). In this case, in the first function unit 112, in the case of S1−b1>0, S10=S1−b1 is set, and in the case of S1−b1<0, S10=0 is set correspondingly.

Further, it is also possible to calculate the second control signal S10 by using a plurality of adder-subtracters to perform addition processing or subtraction processing on plural signals without using the second function unit 120.

The above-described control device 100 may also be constituted to have a program making a computer achieve functions of the above-described respective units.

[B] Operation

FIG. 16A, FIG. 16B, FIG. 16C, FIG. 17A, and FIG. 17B are views illustrating data to be used in the control device in the power generation system according to the fourth embodiment.

Figure 16A:
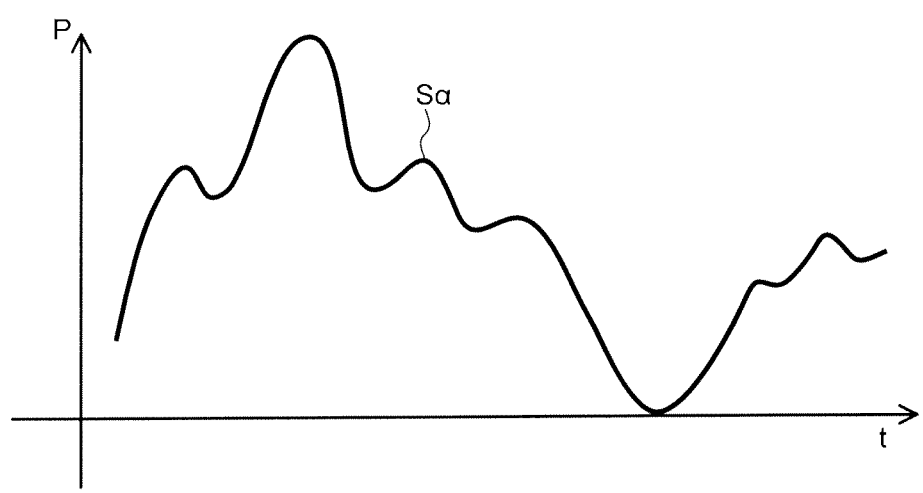
FIG. 16A is a view illustrating data to be used in the control device in the power generation system according to the fourth embodiment.
Figure 16B:
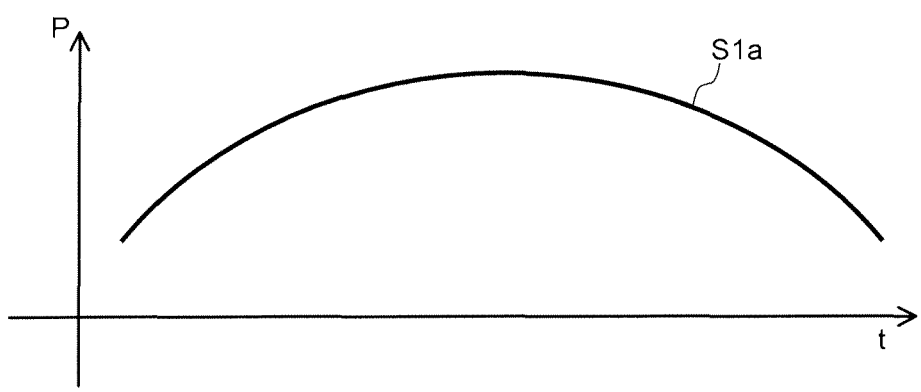
FIG. 16B is a view illustrating data to be used in the control device in the power generation system according to the first embodiment and the fourth embodiment.
Figure 16C:
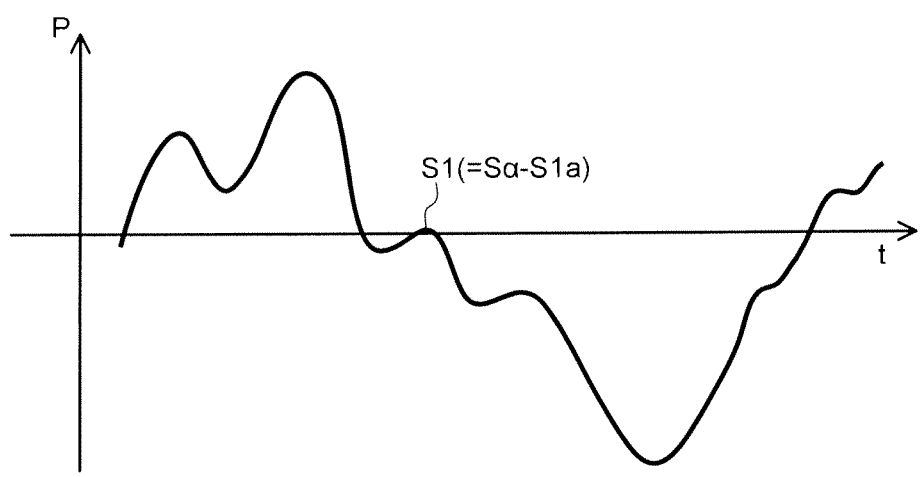
FIG. 16C is a view illustrating data to be used in the control device in the power generation system according to the first embodiment and the fourth embodiment.
Figure 17A:
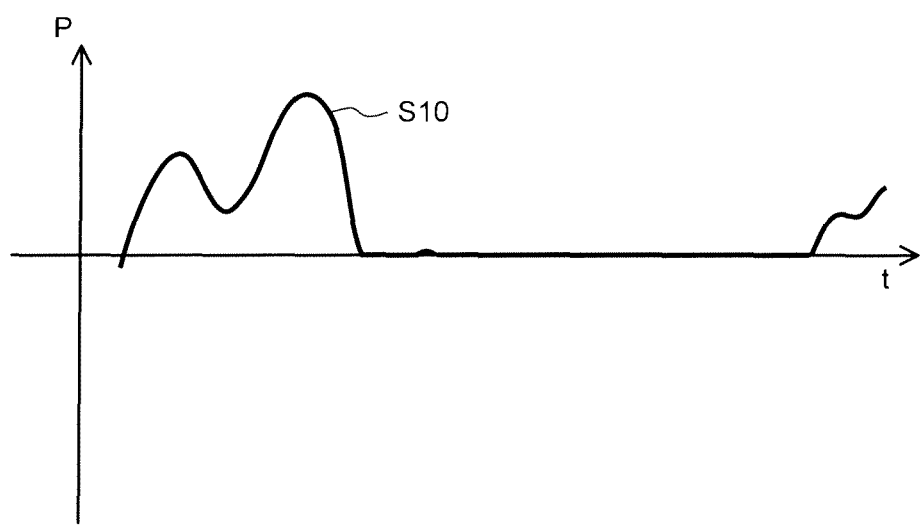
FIG. 17A is a view illustrating data to be used in the control device in the power generation system according to the fourth embodiment.
Figure 17B:
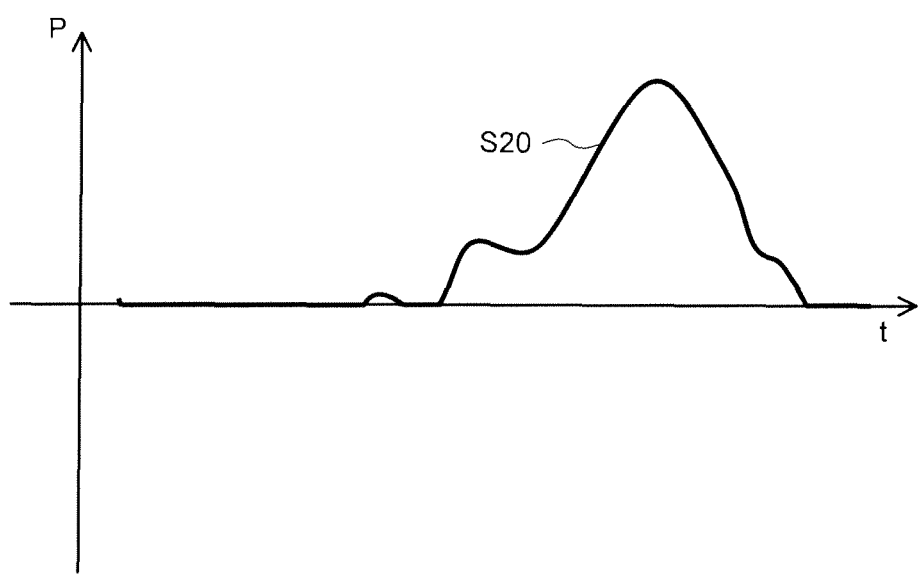
FIG. 17B is a view illustrating data to be used in the control device in the power generation system according to the fourth embodiment.

FIG. 16A illustrates the wind power generation output signal Sα, FIG. 16B illustrates the low-frequency component signal S1a output by the low-pass filter 111a constituting the high-pass filter 111, and FIG. 16C illustrates the high-frequency component signal S1 output by the adder-subtracter 111b constituting the high-pass filter 111. Further, FIG. 17A illustrates the first control signal S10, and FIG. 17B illustrates the second control signal S20. In each of the drawings, the horizontal axis indicates a time t, and the vertical axis indicates a data value P.

Hereinafter, there will be explained an operation of the control device 100 illustrated in FIG. 13 in detail by using FIG. 16A, FIG. 16B, FIG. 16C, FIG. 17A, and FIG. 17B.

First, as illustrated in FIG. 13, in the control device 100, the wind power generation output signal Sα is input to the low-pass filter 111a constituting the high-pass filter 111. With regard to the wind power generation output signal Sα, as illustrated in FIG. 16A, the data value P greatly fluctuates according to the time t due to the cause of wind power fluctuations or the like.

Next, as illustrated in FIG. 13, the low-pass filter 111a low-pass filters the wind power generation output signal Sα, to thereby calculate the low-frequency component signal S1a. The low-frequency component signal S1a, as illustrated in FIG. 16B, corresponds to a low-frequency component contained in the wind power generation output signal Sα (see FIG. 16A).

Next, as illustrated in FIG. 13, the adder-subtracter 111b calculates the high-frequency component signal S1 from the low-frequency component signal S1a output by the low-pass filter 111a and the wind power generation output signal Sα. As illustrated in FIG. 16C, the high-frequency component signal S1 is the resultant obtained by subtracting the low-frequency component signal S1a (see FIG. 16B) from the wind power generation output signal Sα (see FIG. 16A) (S1=Sα−S1a), and is a high-frequency component contained in the wind power generation output signal Sα.

Next, as illustrated in FIG. 13, the first function unit 112 calculates the first control signal S10 from the high-frequency component signal S1 output by the high-pass filter 111. As illustrated in FIG. 17A, the first control signal S10 corresponds to data of a positive component extracted from the high-frequency component signal S1 (see FIG. 16C).

Additionally, as illustrated in FIG. 13, the second function unit 120 calculates the second control signal S20 from the high-frequency component signal S1 output by the high-pass filter 111. As illustrated in FIG. 17B, the second control signal S20 corresponds to data in which a negative component is extracted from the high-frequency component signal S1 (see FIG. 16C) and then the sign of data of the extracted negative component is inverted. In other words, the second control signal S20 is a signal in which by subtracting the first control signal S10 (see FIG. 17A) from the high-frequency component signal S1 (see FIG. 16C), the negative component of the high-frequency component signal S1 is extracted, and then the positive and negative of the negative component of the high-frequency component signal S1 are inverted.

As illustrated in FIG. 13, the first control signal S10 calculated described above is output to the inverter 40. At this time, as illustrated in FIG. 12, the inverter 40 outputs the electric power E12 being part of the electric power E1 output by the wind power generation apparatus 2 to the heater 133 from the first power transmission line 200 according to a signal value of the first control signal S10. Then, the heater 133 generates heat by the output electric power E12 to heat the heating medium F1 flowing inside the first pipe 131.

Concretely, as illustrated in FIG. 17A, when the first control signal S10 is in excess of zero, the electric power E12 being part of the electric power E1 output by the wind power generation apparatus 2 is output to the heater 133. On the other hand, when the first control signal S10 is zero, the electric power E12 is not output to the heater 133.

Further, as illustrated in FIG. 13, the second control signal S20 calculated described above is output to the output control device 50. At this time, as illustrated in FIG. 12, the output control device 50 adjusts the opening degree of the main steam valve 308 according to a signal value of the second control signal S20 and adjusts the amount of the working fluid F2 to flow into the turbine 302. Here, the opening degree of the main steam valve 308 is adjusted to increase as the signal value of the second control signal S20 becomes larger. Thereby, the amount of the electric power E2 generated by the solar thermal power generation apparatus 3 to be output to the second power transmission line 300 is adjusted. Then, the electric power E2 whose output is adjusted is output to the first power transmission line 200. This electric power E2 is combined with the electric power E11 obtained by subtracting the electric power E12, being part of the electric power E1, output to the heater 133 from the electric power E1 output by the wind power generation apparatus 2 to be output to an electric power system.

Concretely, as illustrated in FIG. 17B, when the second control signal S20 is in excess of zero, the output control device 50 adjusts the opening degree of the main steam valve 308 so that the opening degree of the main steam valve 308 may become larger than a predetermined reference value according to the signal value of the second control signal S20. On the other hand, when the second control signal S20 is zero, the output control device 50 maintains the opening degree of the main steam valve 308 to a predetermined reference value.

Incidentally, when a signal obtained by adding a bias to the second control signal S20 is output to the output control device 50, according to a value of the bias, the electric power E2 is further supplied.

Figure 18A:
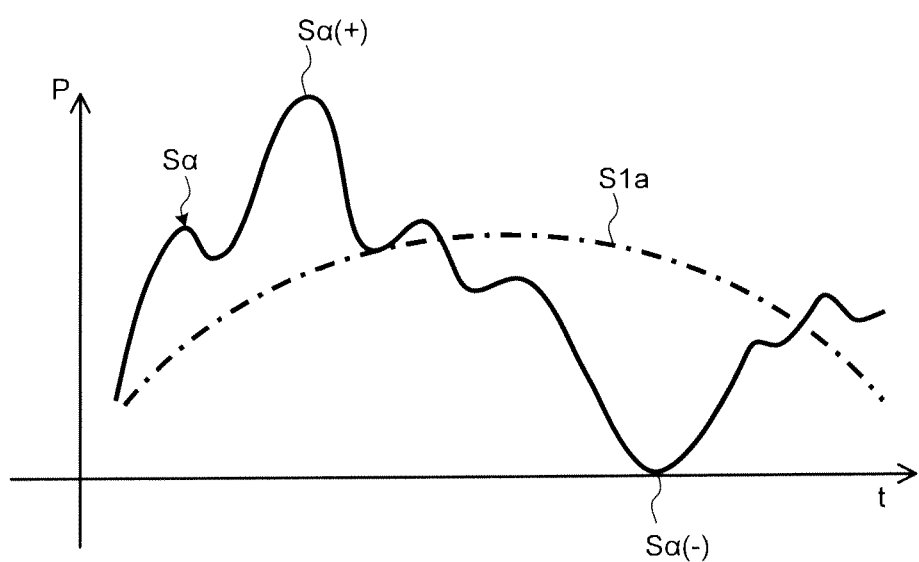
FIG. 18A is a view illustrating data on electric power to be output to an electric power system from a wind power generation apparatus in the power generation system according to the fourth embodiment.
Figure 18B:
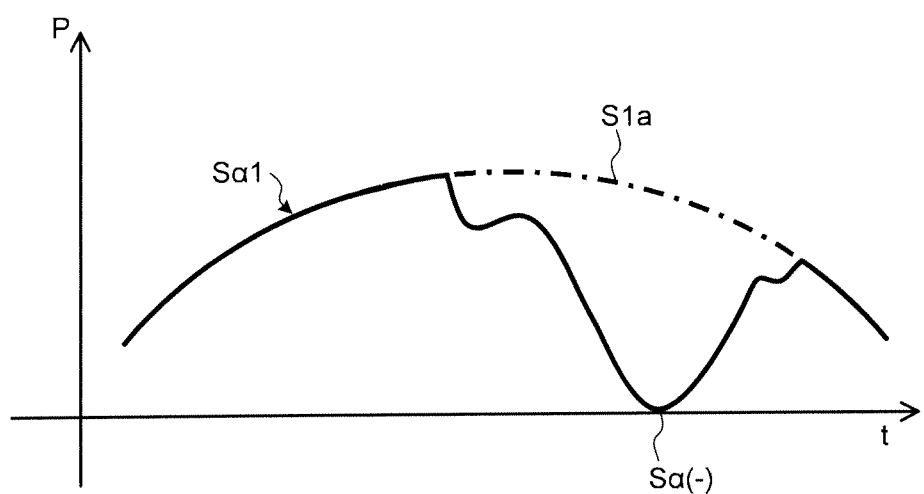
FIG. 18B is a view illustrating data on the electric power to be output to the electric power system from the wind power generation apparatus in the power generation system according to the fourth embodiment.
Figure 18C:
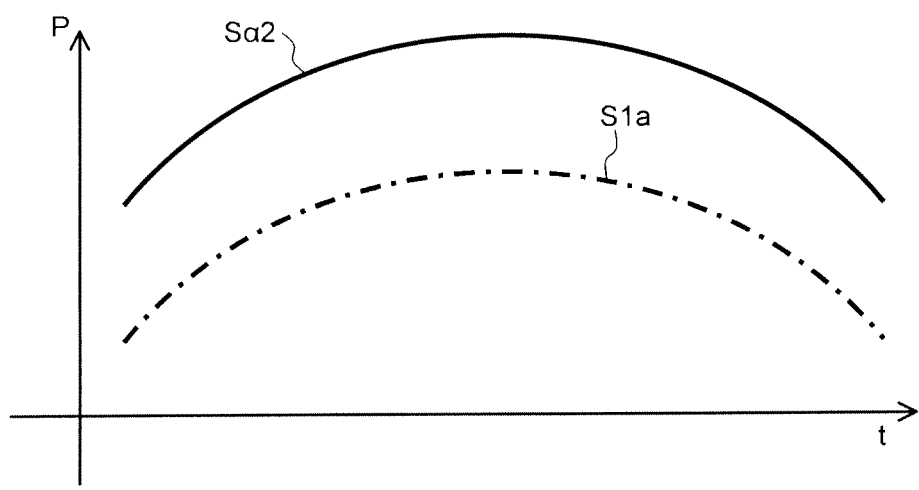
FIG. 18C is a view illustrating data on the electric power to be output to the electric power system from the wind power generation apparatus in the power generation system according to the fourth embodiment.

FIG. 18A, FIG. 18B, and FIG. 18C are views illustrating data on electric power to be output to the electric power system from the wind power generation apparatus in the power generation system according to the fourth embodiment.

FIG. 18A, similarly to FIG. 16A, illustrates the wind power generation output signal Sα of the electric power E1 (see FIG. 12). FIG. 18B illustrates a wind power generation output signal Sα1 of the electric power E11 (E11=E1−E12) (see FIG. 12). FIG. 18C illustrates a wind power generation output signal Sαt of electric power E3 (E3=E11+E2) (see FIG. 12). In FIG. 18A, FIG. 18B, and FIG. 18C, the low-frequency component signal S1a (see FIG. 16B) output by the low-pass filter 111a is illustrated in an overlapping manner.

Hereinafter, there will be explained in detail electric power to be output to the electric power system through the first power transmission line 200 from the wind power generation apparatus 2 in the power generation system 1 illustrated in FIG. 12 by using FIG. 18A, FIG. 18B, and FIG. 18C.

As illustrated in FIG. 12, the data value P of the electric power E11 output by the wind power generation apparatus 2 greatly fluctuates due to the cause of wind power fluctuations or the like as is the wind power generation output signal Sα illustrated in FIG. 18A.

Then, as illustrated in FIG. 12, when the first control signal S10 is output to the inverter 40 from the control device 100, the electric power E12 being part of the electric power E1 output by the wind power generation apparatus 2 is output to the heater 133 from the first power transmission line 200 via the inverter 40. This electric power E12 corresponds to the absolute value of a positive component Sα(+) larger than the low-frequency component signal S1a of the wind power generation output signal Sα (see FIG. 18A).

Therefore, as illustrated in FIG. 12, the electric power E11 obtained after the electric power E12 being part of the electric power E1 is output to the heater 133 is brought into a state where the positive component Sα(+), of the wind power generation output signal Sα (see FIG. 18A), larger than the low-frequency component signal S1a is cut off, as is the wind power generation output signal Sα1 illustrated in FIG. 18B. That is, it is brought into a state where of the wind power generation output signal Sα, the portion of the positive component Sα(+) larger than the low-frequency component signal S1a output by the low-pass filter 111a is smoothed.

Then, as illustrated in FIG. 12, when the second control signal S20 is output to the output control device 50, the opening degree of the main steam valve 308 is adjusted, and thereby adjustment of the electric power E2 is performed. Then, the adjusted electric power E2 is output to the first power transmission line 200 from the solar thermal power generation apparatus 3 to be combined. This electric power E2 is brought into a form in which the absolute value of a negative component Sα(−), of the wind power generation output signal Sα (see FIG. 18A), smaller than the low-frequency component signal S1a is added to the low-frequency component signal S1a.

Therefore, as illustrated in FIG. 12, the electric power E3 obtained by combination of the electric power E2 is brought into a state similar to that of the low-frequency component signal S1a output by the low-pass filter 111a as is the wind power generation output signal Sαt illustrated in FIG. 18C. That is, the electric power E3 is brought into a state where of the wind power generation output signal Sα (see FIG. 18A), the positive component Sα(+) larger than the low-frequency component signal S1a is cut off and the negative component Sα(−) smaller than the low-frequency component signal S1a is added.

As above, the electric power E3 to be finally output to the electric power system through the first power transmission line 200 from the wind power generation apparatus 2 is smoothed to be in a state with reduced fluctuations.

[C] Summary

As above, in the power generation system 1 in this embodiment, the electric power E1 (first electric power) generated by wind power in the wind power generation apparatus 2 is output to the first power transmission line 200. Besides, in the solar thermal power generation apparatus 3, the electric power E2 (second electric power) generated by the working fluid F2 heat exchanged with the heating medium F1 heated by solar heat and the heater 133 is output to the second power transmission line 300. At this time, in this embodiment, the inverter 40 outputs the electric power E12 being part of the electric power E1 output by the wind power generation apparatus 2 to the heater 133 according to the first control signal S10. Additionally, the output control device 50 adjusts the electric power E2 output by the solar thermal power generation apparatus 3 according to the second control signal S20 to output the electric power E2 to the first power transmission line 200 through the second power transmission line 300. The control device 100, based on the wind power generation output signal Sα obtained according to the electric power E1, outputs the first control signal S10 to the inverter 40 and outputs the second control signal S20 to the output control device 50. Concretely, in the control device 100, the high-pass filter 111 extracts the high-frequency component signal S1 contained in the wind power generation output signal Sα. Then, the first function unit 112 (the first control signal calculation unit) extracts the positive component from the high-frequency component signal S1, to thereby calculate the first control signal S10. Then, the second function unit 120 (the second control signal calculation unit) extracts the negative component from the high-frequency component signal S1, to thereby calculate the second control signal S20.

As above, in this embodiment, with respect to the power generation output of the wind power generation apparatus 2, fast fluctuations for several seconds or so or lower can be absorbed, and in the solar thermal power generation apparatus 3, electric power can be output by slow power generation of several minutes or so. Therefore, as described above, in this embodiment, the electric power E3 to be finally output to the electric power system through the first power transmission line 200 from the wind power generation apparatus 2 can be smoothed (see FIG. 18A, FIG. 18B, and FIG. 18C, for example).

Consequently, in this embodiment, smoothing of power generation output is easy, and stabilization of electric power can be achieved easily. Further, in this embodiment, power generation is performed in the solar thermal power generation apparatus 3, so that electric power larger than a cut portion of the electric power generated in the wind power generation apparatus 2 can be output.

Besides, in this embodiment, the high-pass filter 111 has the time constant τ smaller than 1 minute. Therefore, the stabilization of electric power can be further achieved. This reason is explained by using the drawing.

As is clear from FIG. 4 described above, when the time constant τ of the high-pass filter 111 (the fluctuation time period) is 1 minute or so, generated electric power with the time constant τ (the fluctuation time period) of 1 minute or longer is adjustable in thermal power generation. Therefore, together with the present control, demand control is enabled in the whole region and good electric power quality can be achieved.

Fifth Embodiment

[A] Constitution

Figure 19:
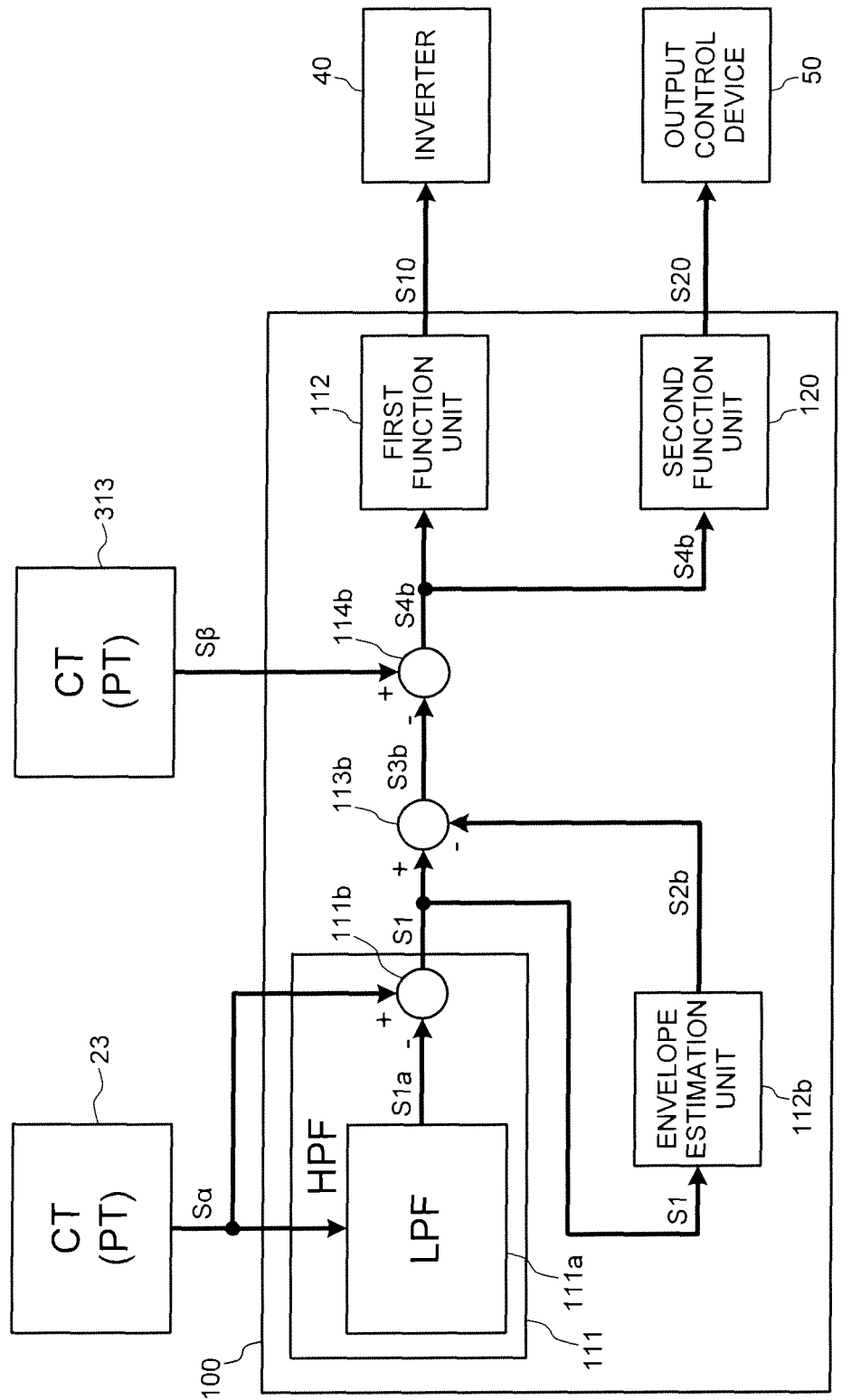
FIG. 19 is a block diagram illustrating a control device and members to perform input and output of data with the control device in a power generation system according to a fifth embodiment.

FIG. 19 is a block diagram illustrating a control device and members to perform input and output of data with the control device in a power generation system according to a fifth embodiment, With respect to this embodiment, as illustrated in FIG. 19, part of the constitution of a control device 100 is different from the case of the fourth embodiment (see FIG. 13). Further, this embodiment is similar to the above-described embodiments except for these points and related points. Therefore, in this embodiment, descriptions of portions overlapping the above-described embodiments are omitted as necessary.

As illustrated in FIG. 19, to the control device 100, the wind power generation output signal Sα is input from the current transformer 23 (the potential transformer), similarly to the fourth embodiment. Besides, to the control device 100, a solar thermal power generation output signal Sβ is input from a current transformer 313, unlike the fourth embodiment. The solar thermal power generation output signal Sβ is not illustrated in FIG. 12, but is data on the electric power E2 (see FIG. 12) output from the solar thermal power generation apparatus 3.

Then, the control device 100 outputs the first control signal S10 to the inverter 40 based on the input wind power generation output signal Sα and solar thermal power generation output signal Sβ. Additionally, the control device 100 outputs the second control signal S20 to the output control device 50 based on the input wind power generation output signal Sα and solar thermal power generation output signal Sβ.

Further, in this embodiment, the control device 100, in addition to the high-pass filter 111, the first function unit 112, and the second function unit 120, includes: an envelope estimation unit 112b; a first adder-subtracter 113b; and a second adder-subtracter 114b, unlike the fourth embodiment.

Of the control device 100, the envelope estimation unit 112b receives the high-frequency component signal S1 from the high-pass filter 111. Then, the envelope estimation unit 112b performs processing of estimating, of an envelope of the high-frequency component signal S1, the envelope on the minimum value side, to thereby calculate an envelope signal S2b. The envelope estimation unit 112b detects plural minimum values of the high-frequency component signal S1 and performs fitting processing by using data of the plural minimum values, to thereby calculate the envelope signal S2b. For example, the envelope estimation unit 112b connects a first minimum value detected immediately and a second minimum value detected immediately before the detection of the first minimum value by a straight line to be extrapolated, to thereby calculate the envelope signal S2b.

Of the control device 100, the first adder-subtracter 113b receives the high-frequency component signal S1 from the high-pass filter 111 and receives the envelope signal S2b from the envelope estimation unit 112b. Then, the first adder-subtracter 113b performs processing of subtracting the envelope signal S2b from the high-frequency component signal S1, to thereby calculate a first adder-subtracter output signal S3b.

Of the control device 100, the second adder-subtracter 114b receives the first adder-subtracter output signal S3b and receives the solar thermal power generation output signal Sβ from the current transformer 313. Then, the second adder-subtracter 114b performs processing of subtracting the solar thermal power generation output signal Sβ from the first adder-subtracter output signal S3b, to thereby calculate a second adder-subtracter output signal S4b. Then, the second adder-subtracter 114b outputs the calculated second adder-subtracter output signal S4b to the first function unit 112 and the second function unit 120.

Then, the first function unit 112, similarly to the case of the fourth embodiment, performs processing of calculating the first control signal S10 from the second adder-subtracter output signal S4b by using the function illustrated in FIG. 14. Then, the first function unit 112 outputs the first control signal S10 to the inverter 40, as illustrated in FIG. 19.

On the other hand, the second function unit 120, similarly to the case of the fourth embodiment, performs processing of calculating the second control signal S20 from the second adder-subtracter output signal S4b by using the function illustrated in FIG. 15. Then, the second function unit 120 outputs the second control signal S20 to the output control device 50, as illustrated in FIG. 19.

[B] Operation

FIG. 20A, FIG. 20B, FIG. 20C, FIG. 20D, FIG. 21A, and FIG. 21B are views illustrating data to be used in the control device in the power generation system according to the fifth embodiment.

Figure 20A:
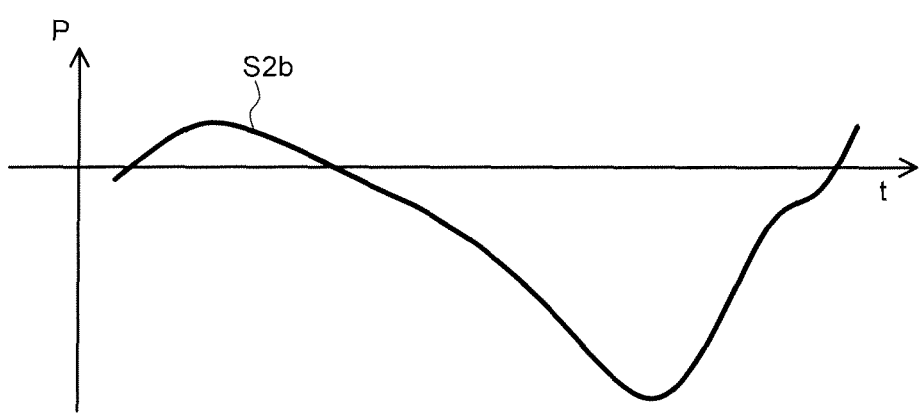
FIG. 20A is a view illustrating data to be used in the control device in the power generation system according to the fifth embodiment.
Figure 20B:
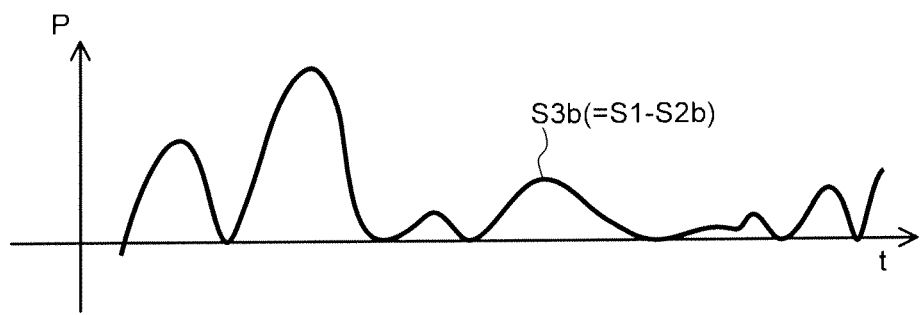
FIG. 20B is a view illustrating data to be used in the control device in the power generation system according to the fifth embodiment.
Figure 20C:
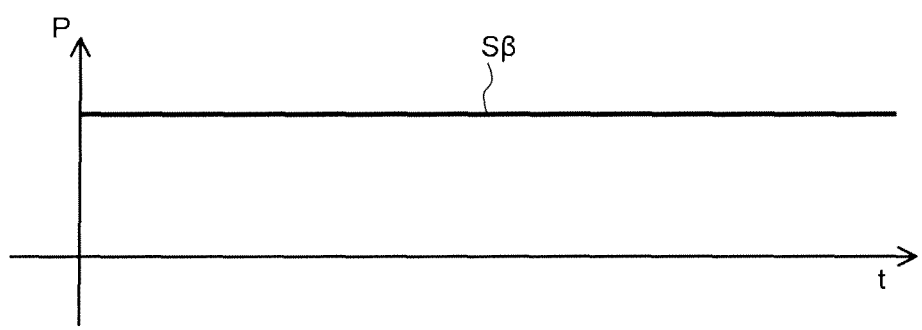
FIG. 20C is a view illustrating data to be used in the control device in the power generation system according to the fifth embodiment.
Figure 20D:
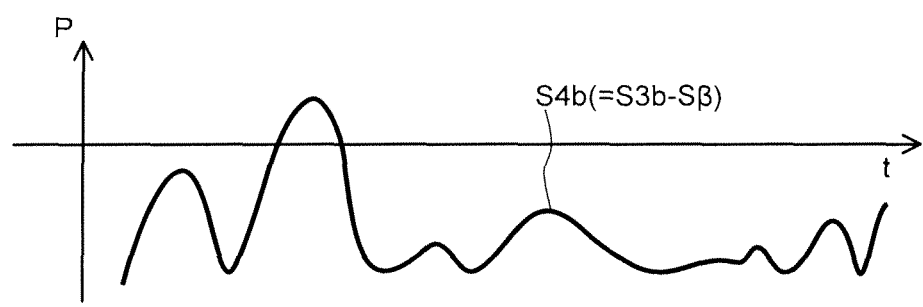
FIG. 20D is a view illustrating data to be used in the control device in the power generation system according to the fifth embodiment.
Figure 21A:
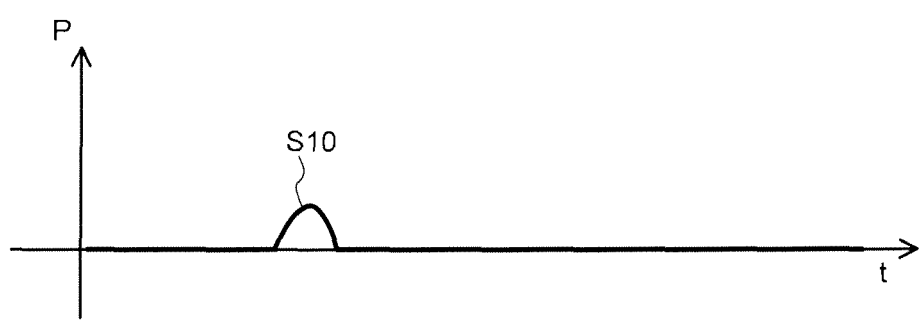
FIG. 21A is a view illustrating data to be used in the control device in the power generation system according to the fifth embodiment.
Figure 21B:
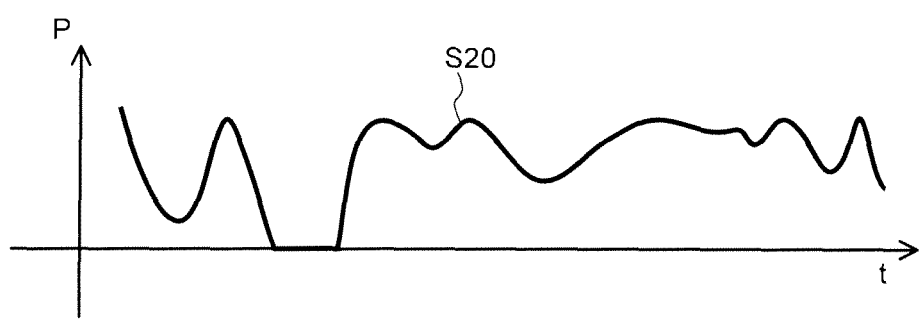
FIG. 21B is a view illustrating data to be used in the control device in the power generation system according to the fifth embodiment.

FIG. 20A illustrates the envelope signal S2b, FIG. 20B illustrates the first adder-subtracter output signal S3b, FIG. 20C illustrates the solar thermal power generation output signal Sβ, and FIG. 20D illustrates the second adder-subtracter output signal S4b. Further, FIG. 21A illustrates the first control signal S10, and FIG. 21B illustrates the second control signal S20. In each of the drawings, the horizontal axis indicates the time t and the vertical axis indicates the data value P.

Hereinafter, there will explained an operation of the control device 100 illustrated in FIG. 19 in detail with reference to FIG. 20A, FIG. 20B, FIG. 20C, FIG. 20D, FIG. 21A, and FIG. 21B.

First, as illustrated in FIG. 19, in the control device 100, similarly to the case of the fourth embodiment, the wind power generation output signal Sα (see FIG. 16A) is input to the high-pass filter 111. Then, the high-pass filter 111 high-pass filters the input wind power generation output signal Sα, to thereby calculate the high-frequency component signal S1 (see FIG. 16C), and then outputs the high-frequency component signal S1 to the envelope estimation unit 112b.

Next, as illustrated in FIG. 19, the envelope estimation unit 112b calculates the envelope signal S2b from the high-frequency component signal S1 output by the high-pass filter 111. As illustrated in FIG. 20A, the envelope signal S2b corresponds to data of the envelope on the minimum value side of the envelope of the high-frequency component signal S1 (see FIG. 16C).

Next, as illustrated in FIG. 19, the first adder-subtracter 113b calculates the first adder-subtracter output signal S3b from the envelope signal S2b and the high-frequency component signal S1. As illustrated in FIG. 20B, the first adder-subtracter output signal S3b corresponds to data obtained by subtracting the envelope signal S2b from the high-frequency component signal S1 (S3b=S1−S2b).

Next, as illustrated in FIG. 19, the second adder-subtracter 114b calculates the second adder-subtracter output signal S4b from the first adder-subtracter output signal S3b and the solar thermal power generation output signal Sβ. As illustrated in FIG. 20C and FIG. 20D, the second adder-subtracter output signal S4b corresponds to data obtained by subtracting the solar thermal power generation output signal sβ from the first adder-subtracter output signal S3b.

Next, as illustrated in FIG. 19, the first function unit 112 calculates the first control signal S10 from the second adder-subtracter output signal S4b. As illustrated in FIG. 21A, the first control signal S10 corresponds to data of a positive component extracted from the second adder-subtracter output signal S4b (see FIG. 20D).

Additionally, as illustrated in FIG. 19, the second function unit 120 calculates the second control signal S20 from the second adder-subtracter output signal S4b. As illustrated in FIG. 21B, the second control signal S20 corresponds to data in which a negative component is extracted from the second adder-subtracter output signal S4b (see FIG. 20D) and then the sign of data of the extracted negative component is inverted. In other words, the second control signal S20 is a signal in which by subtracting the first control signal S10 (see FIG. 21A) from the second adder-subtracter output signal S4b (see FIG. 20D), the negative component of the second adder-subtracter output signal S4b is extracted, and then the positive and negative of the negative component of the second adder-subtracter output signal S4b are inverted.

Thereafter, as illustrated in FIG. 19, the first control signal S10 calculated described above is output to the inverter 40. At this time, as illustrated in FIG. 12, the inverter 40, similarly to the case of the fourth embodiment, outputs the electric power E12 being part of the electric power E1 output by the wind power generation apparatus 2 to the heater 133 from the first power transmission line 200 according to the first control signal S10. Then, the heater 133 heats the heating medium F1 flowing inside the first pipe 131 by the output electric power E12.

Further, as illustrated in FIG. 19, the second control signal S20 calculated described above is output to the output control device 50. At this time, as illustrated in FIG. 12, the output control device 50, similarly to the case of the fourth embodiment, adjusts the electric power E2 output by the solar thermal power generation apparatus 3 according to the second control signal S20 and outputs the electric power E2 to the first power transmission line 200 through the second power transmission line 300. The electric power E2 is combined with the electric power E11 obtained by subtracting the electric power E12, being part of the electric power E1, output to the heater 133 from the electric power E1 output by the wind power generation apparatus 2 to be output to the electric power system.

Therefore, in this embodiment, similarly to the case of the fourth embodiment, the electric power E3 to be finally output to the electric power system from the wind power generation apparatus 2 is smoothed to be in a state with reduced fluctuations.

[C] Summary

As above, in this embodiment, the control device 100, based on the wind power generation output signal Sec obtained according to the electric power E1 and further the solar thermal power generation output signal Sβ obtained according to the electric power E2, outputs the first control signal S10 to the inverter 40 and outputs the second control signal S20 to the output control device 50. Concretely, in the control device 100, the envelope estimation unit 112b performs processing of estimating the envelope on the minimum value side of the envelope of the high-frequency component signal S1, to thereby calculate the envelope signal S2b. Then, the first adder-subtracter 113b performs processing of subtracting the envelope signal S2b from the high-frequency component signal S1, to thereby calculate the first adder-subtracter output signal S3b. Then, the second adder-subtracter 114b performs processing of subtracting the solar thermal power generation output signal Sβ from the first adder-subtracter output signal S3b, to thereby calculate the second adder-subtracter output signal S4b. Thereafter, the first function unit 112 (the first control signal calculation unit) extracts the positive component from the second adder-subtracter output signal S4b, to thereby calculate the first control signal S10. Additionally, the second function unit 120 (the second control signal calculation unit) extracts the negative component from the second adder-subtracter output signal S4b, to thereby calculate the second control signal S20.

Therefore, in this embodiment, similarly to the case of the fourth embodiment, the electric power E3 to be finally output to the electric power system through the first power transmission line 200 from the wind power generation apparatus 2 can be smoothed.

Consequently, in this embodiment, smoothing of power generation output is easy, and stabilization of electric power can be achieved easily.

Further, in this embodiment, the envelope estimation unit 112b connects, of the high-frequency component signal S1, the first minimum value detected immediately and the second minimum value detected immediately before the detection of the first minimum value by a straight line to be extrapolated, to thereby calculate the envelope signal S2b. In this case, electric power of the wind power generation that is converted into heat by the heater 133 reduces. When the electric power is converted into heat, only the part multiplied by power generation efficiency of the solar thermal power generation returns to electric power, so that the efficiency becomes 20 to 30% or so generally. Thus, 70 to 80% or so of the electric power results in a loss. Thus, when the electric power to be converted into heat by the heater 133 reduces, the entire loss reduces to be quite preferable.

In the foregoing, while certain embodiments of the present invention have been described, these embodiments have been presented by way of example only, and are not intended to limit the scope of the inventions. Indeed, the novel methods described herein may be embodied in a variety of other forms; furthermore, various omissions, substitutions and changes in the form of the methods described herein may be made without departing from the spirit of the inventions. The accompanying claims and their equivalents are intended to cover such forms or modification examples as would fall within the scope and sprit of the inventions.

Further, the respective components described in the above-described embodiments may also be fabricated by programs installed into a storage such as a hard disk device of a computer, and further it is also possible that the above-described programs are stored in computer readable electronic media, and the programs are read by a computer from the electronic media, and thereby the computer achieves the functions of the present invention. As the electronic media, for example, a recording medium such as CD-ROM, a flash memory, removable media, and the like are included. Further, the functions of the present invention may also be achieved in a manner that the components are dispersively stored in a different computer connected via a network and communication is performed with the computer in which the respective components are made to function.

What is claimed is:

1. A power generation system, comprising:
    a wind power generation apparatus;
    a solar thermal power generation apparatus including:
        a heater heating a heating medium by solar heat; and
        a heat exchanger exchanging heat of the heating medium heated by the heater and heat of a working fluid to operate a drive mechanism of a power generator;
    an electrothermal converting unit; and
    a controller that divides electric power generated by the wind power generation apparatus into a first electric power component and a second electric power component other than the first electric power component,
    wherein the first electric power component comprises a high-frequency component having a frequency higher than a predetermined frequency,
    wherein the controller provides the first electric power component to the electrothermal converting unit and provides the second electric power component to an electric distribution system at the same time as the providing the first electric power component, and the electrothermal converting unit converts the first electric power component into heat to heat the heating medium.

2. The power generation system according to claim 1, wherein the electrothermal converting unit includes:
    an electric heater;
    an electric power converting section converting the first electric power component to electric power to drive the electric heater; and
    an electric power conversion control section controlling an operation of the electric power converting section so that the high-frequency component of electric power generated by the wind power generation apparatus is converted into electric power to drive the electric heater, the electric power conversion control section including a high-pass filter.

3. The power generation system according to claim 2, wherein in the high-pass filter, a time constant smaller than 1 minute is set.

4. The power generation system according to claim 1, wherein the heater includes:
    a mirror where sunlight is collected;
    a pipe in which the heating medium is transferred; and
    a mirror driving unit changing a relative orientation of the mirror with respect to the pipe,
    the power generation system further comprising:
        a heating medium circulation channel that includes the pipe as part of the heating medium circulation channel and in which the heating medium is circulated through the heater, the electrothermal converting unit, and the heat exchanger;
a temperature sensor detecting a temperature of the heating medium circulating in the heating medium circulation channel; and
a heating medium heating control unit controlling an operation of the mirror driving unit based on a detection result made by the temperature sensor.

5. The power generation system according to claim 4, further comprising:
a heating medium transfer pump generating motive power to transfer the heating medium along the heating medium circulation channel,
wherein the heating medium heating control unit controls an operation of the heating medium transfer pump based on a detection result made by the temperature sensor.

6. A power generation system configured to include a wind power generation in which rotation of a windmill generates electric power, and a solar thermal power generation in which a heating medium used for power generation apparatus circulates in a pipe and is heated by heat collected by a solar heat collector, the power generation system comprising:
a smoothed electric power signal generation unit generating a smoothed electric power signal from wind power generated electric power obtained by the wind power generation;
a tower shadow effect electric power generation unit obtaining, based on the smoothed electric power signal generated by the smoothed electric power signal generation unit, a rotation speed of the windmill measured from the windmill, and previously stored data simulating rotation of blades of the windmill, a reduction amount of power generation output when one of the blades of the rotating windmill passes by a tower of the windmill and generating tower shadow effect electric power by subtracting the reduction amount from the smoothed electric power signal;
an envelope generation section generating an envelope connecting lower limit values of the wind power generated electric power fluctuating for a short term based on the tower shadow effect electric power generated by the tower shadow effect electric power generation unit and the smoothed electric power signal output by the smoothed electric power signal generation unit;
a short-term fluctuation component separation section separating a short-term fluctuation component from the wind power generated electric power in accordance with the envelope generated by the envelope generation section; and
an electric power converting section converting the short-term fluctuation component separated by the short-term fluctuation component separation section into electric power to drive a heater that heats the pipe for heating medium circulation.

7. The power generation system according to claim 6, wherein the envelope generation section generates an envelope by subtracting an amplitude of the shadow effect electric power from an electric power signal obtained by adding the tower shadow effect electric power to the wind power generated electric power.

8. The power generation system according to claim 6, wherein the tower shadow effect electric power generation unit includes: a tower shadow effect electric power calculation section that calculates timing at which the blade of the windmill goes behind the tower, calculates a torque reduction at the timing, and calculates a reduction amount of a power generation amount caused by the torque reduction.

9. The power generation system according to claim 6, wherein the smoothed electric power signal generation unit includes:
a delay filter that delays the wind power generated electric power with a time constant of 1 second to 60 seconds to smooth the wind power generated electric power and outputs the smoothed electric power signal.

10. A power generation system comprising:
a wind power generation apparatus outputting first electric power generated by wind power to a first power transmission line;
a solar thermal power generation apparatus outputting second electric power generated by a working fluid heat exchanged with a heating medium heated by solar heat and a heater to a second power transmission line;
an inverter outputting electric power, being part of the first electric power, to the heater according to a first control signal;
an output control device adjusting output of the second electric power according to a second control signal and outputting the second electric power to the first power transmission line; and
a control device outputting, based on a wind power generation output signal obtained with respect to the first electric power, the first control signal to the inverter and outputting the second control signal to the output control device,
wherein the control device includes:
a high-pass filter extracting a high-frequency component signal contained in the wind power generation output signal;
a first control signal calculation unit calculating a signal obtained by extracting a positive component from the high-frequency component signal as the first control signal; and
a second control signal calculation unit calculating a signal obtained by extracting a negative component from the high-frequency component signal and inverting positive and negative as the second control signal.

11. The power generation system according to claim 10, wherein the high-pass filter has a time constant smaller than 1 minute.

12. The power generation system according to claim 10, wherein the control device outputs, as the second control signal, a signal obtained by adding a bias to the signal obtained by extracting the negative component from the high-frequency component signal in the second control signal calculation unit to the output control device.

13. A power generation system comprising:
a wind power generation apparatus outputting first electric power generated by wind power to a first power transmission line;
a solar thermal power generation apparatus outputting second electric power generated by a working fluid heat exchanged with a heating medium heated by solar heat and a heater to a second power transmission line;
an inverter outputting electric power, being part of the first electric power, to the heater according to a first control signal;

an output control device adjusting output of the second electric power according to a second control signal and outputting the second electric power to the first power transmission line; and a control device outputting, based on a wind power generation output signal obtained with respect to the first electric power and a solar thermal power generation output signal obtained with respect to the second electric power, the first control signal to the inverter and outputting the second control signal to the output control device, wherein the control device includes:
- a high-pass filter extracting a high-frequency component signal contained in the wind power generation output signal;
- an envelope estimation unit calculating an envelope signal by performing processing of estimating, of an envelope of the high-frequency component signal, the envelope on the minimum value side;
- a first adder-subtracter calculating a first adder-subtracter output signal by performing processing of subtracting the envelope signal from the high-frequency component signal;
- a second adder-subtracter calculating a second adder-subtracter output signal by performing processing of subtracting the solar thermal power generation output signal from the first adder-subtracter output signal;
- a first control signal calculation unit calculating a signal obtained by extracting a positive component from the second adder-subtracter output signal as the first control signal; and
- a second control signal calculation unit calculating a signal obtained by extracting a negative component from the second adder-subtracter output signal and inverting positive and negative as the second control signal.

14. The power generation system according to claim 13, wherein the envelope estimation unit connects, of the high-frequency component signal, a first minimum value detected immediately and a second minimum value detected immediately before the detection of the first minimum value by a straight line to be extrapolated, to thereby calculate an envelope signal.

* * * * *